United States Patent [19]

Lehmann et al.

[11] Patent Number: 4,890,255

[45] Date of Patent: Dec. 26, 1989

[54] DATA PROCESSING DEVICE FOR SIMULTANEOUSLY ACTIVATING AND APPLYING PARALLER TRAINS OF COMMANDS TO MEMORIES FOR STORING MATRICES

[76] Inventors: Jean-Philippe Lehmann, 28, rue des Pecheurs, 13007 Marseille; Patrick Isoardi, 7, rue du Marechal Leclerc, 67640 Fegersheim, both of France

[21] Appl. No.: 913,678

[22] PCT Filed: Dec. 30, 1985

[86] PCT No.: PCT/FR85/00378

§ 371 Date: Sep. 2, 1986

§ 102(e) Date: Sep. 2, 1986

[87] PCT Pub. No.: WO86/04167

PCT Pub. Date: Jul. 17, 1986

[30] Foreign Application Priority Data

Dec. 31, 1984 [FR] France .................. 84 20185

[51] Int. Cl.[4] ............... G06F 12/02; G06F 15/347
[52] U.S. Cl. .................. 364/900; 364/736; 364/929.1; 364/931.02; 364/931.51
[58] Field of Search ... 364/730, 735, 736, 200 MS File, 364/900 MS File

[56] References Cited

U.S. PATENT DOCUMENTS 3,651,495  3/1972  Sauvan ..................... 364/900
3,996,559  12/1976  Morrin et al. ............. 364/900
4,570,236  2/1986  Rebel et al. ............... 364/900
4,709,327  11/1987  Hillis et al. .............. 364/200

FOREIGN PATENT DOCUMENTS 2092785  8/1982  United Kingdom .
2123998  2/1984  United Kingdom .

OTHER PUBLICATIONS

"Design and Performance of Generalized Interconnection Networks", IEEE Transactions and Computers, vol. C32, No. 12, Dec. 12, 1983, New York, U.S.A., L. N. Bhuyan et al.

*Primary Examiner*—David Y. Eng
*Assistant Examiner*—Emily Y. Chan
*Attorney, Agent, or Firm*—Lowe, Price, LeBlanc, Becker & Shur

[57] ABSTRACT

A memory management device includes circuits having a DCh base activate in a set of N circular commands, h successive commands among the set of commands. A device DCh activates h columns among K: $S_0, \ldots, S_{K-1}$. A device DC2 activates two line sections among 2L: $S'_0, S''_0, \ldots, S'_{L-1}, S''_{L-1}$. The device DC2 is dependent upon a condition $C_d$ which indicates if a limit d is exceeded by the activated columns, in which case the activation goes from $S'_i$ and $S''_i$ and $S'_{i+1}$, or else from $S''_i$ and $S'_{i+1}$ to $S'_{i+1}$ and $S''_{i+1}$ and so on. Selection of groups of memory cells in a matrix-organized field is by high and low addresses transmitted to the devices DC2 and DCh by means of buses $B_L$ and $B_K$.

16 Claims, 10 Drawing Sheets

Perm (4)

Device DCh

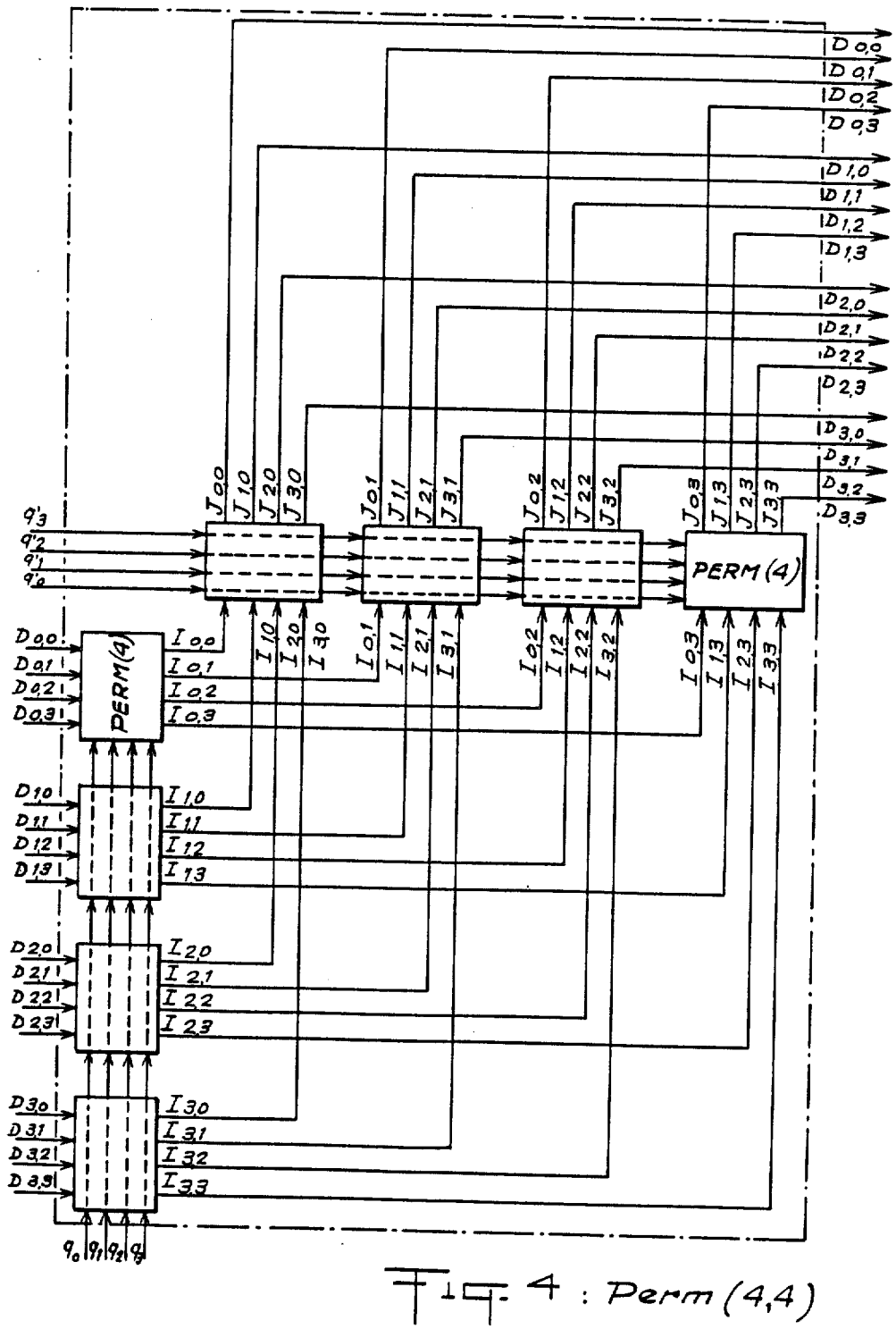
Fig. 4: Perm (4,4)

Device DChN(a)1

Device DChN(a)2

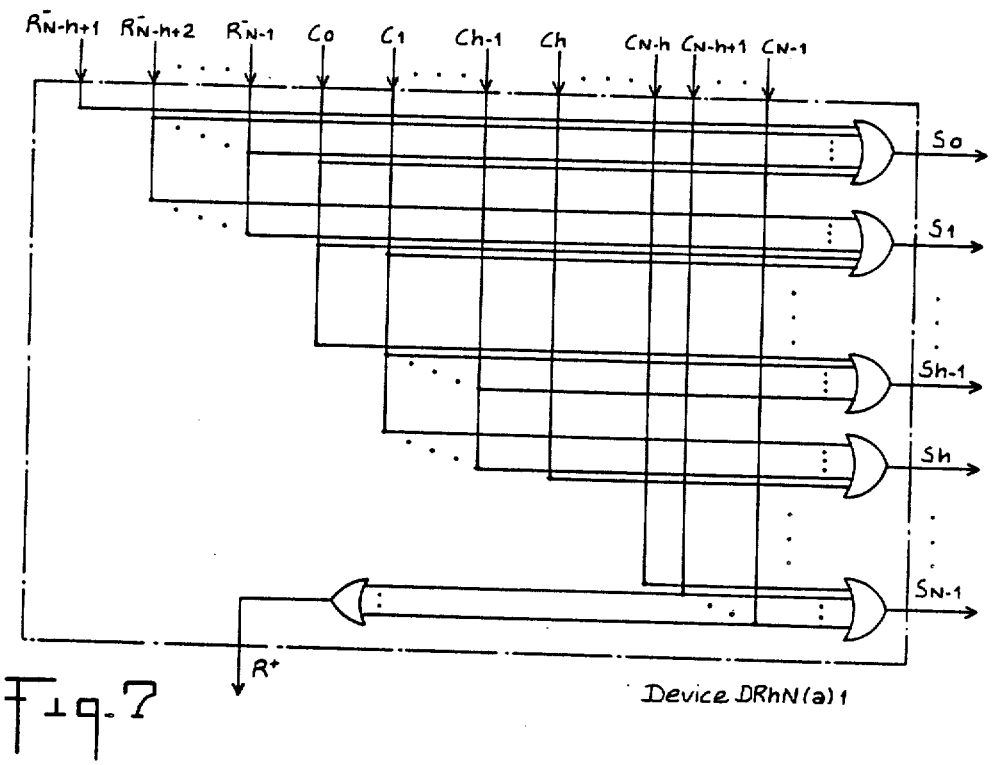
Fig. 7 — Device DRhN(a)1
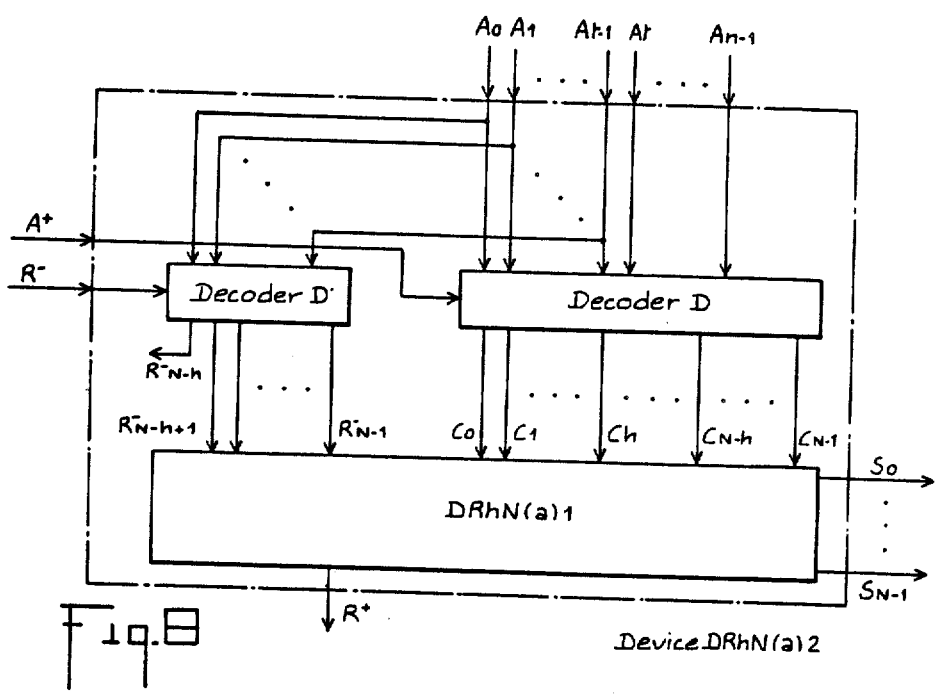
Fig. 8 — Device DRhN(a)2

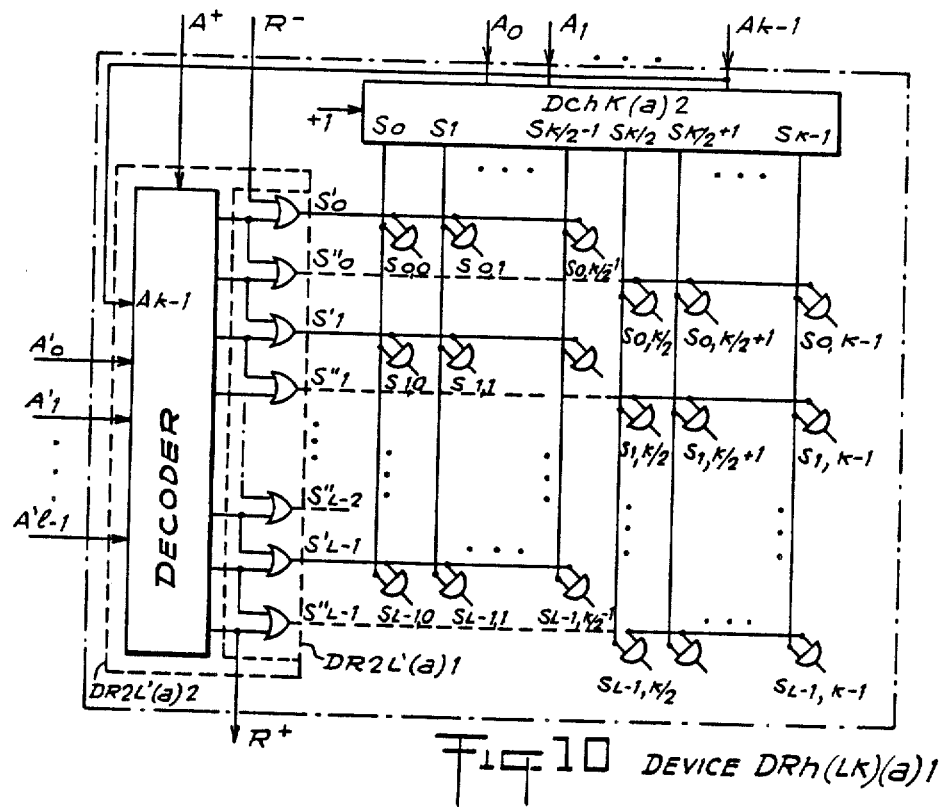
Fig. 10 DEVICE DRh(LK)(a)1
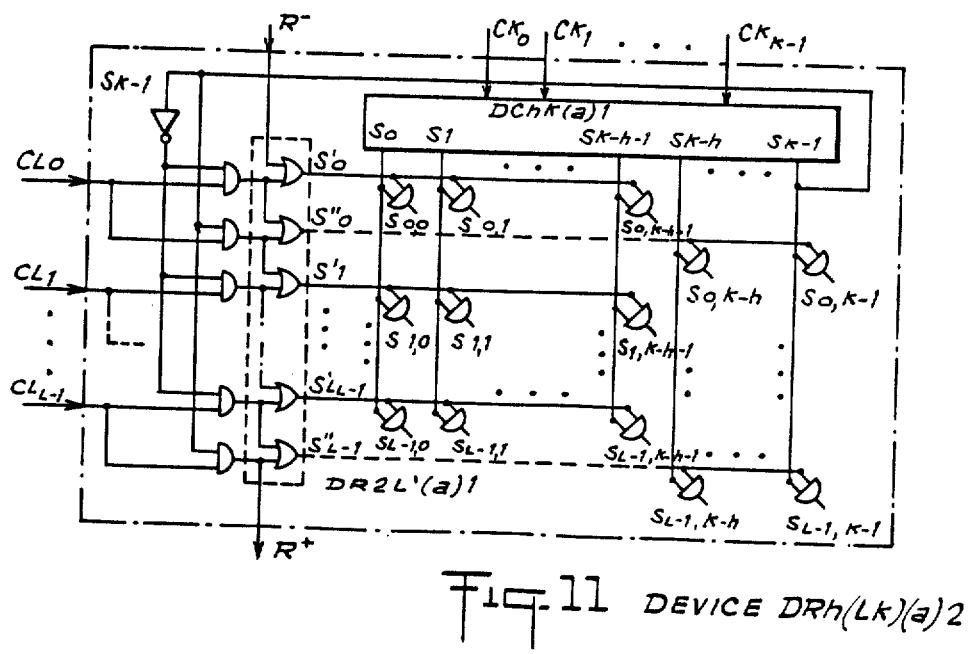
Fig. 11 DEVICE DRh(LK)(a)2

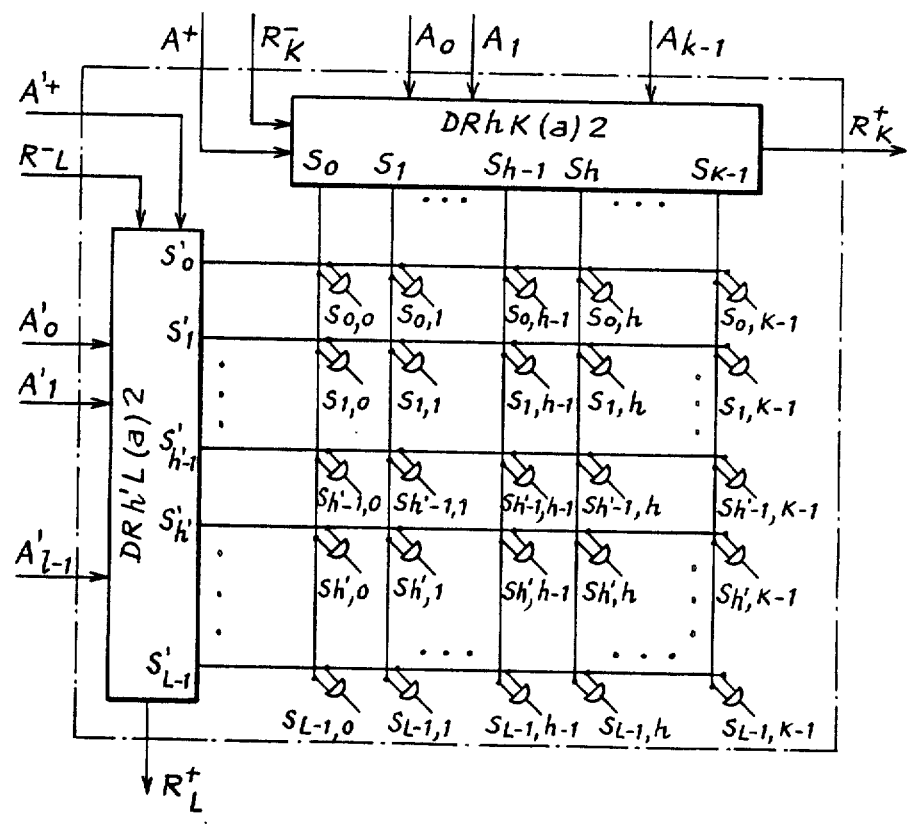
Fig_12  DR(hh')(KL)(a)

4,890,255

DATA PROCESSING DEVICE FOR SIMULTANEOUSLY ACTIVATING AND APPLYING PARALLER TRAINS OF COMMANDS TO MEMORIES FOR STORING MATRICES

TECHNICAL FIELD

This invention relates to digital computers and more particularly to computer memory circuitry.

BACKGROUND ART

In computer techniques, memory structures are presently, in the last analysis, in the form of sets of individually-addressable locations each of which is disjoint from the others. In many situations, it may happen that the user is unaware of this partitioning, but the constraint remains at the finest level internally. Various techniques have been implemented for mitigating this constraint, using hardware, software, or even by combining both: Escaping from partitioning consists in being able to "slide" through memory space while accessing overlapping locations without being obliged to operate on segmented space by jumping from one segment to another. In order to mitigate these drawbacks, there exists the resource at the highest level of evolved languages, while at machine level it is possible to use a single processor instruction to access data straddling two memory segments, however in this case it is, in fact, the microprogram which performs the necessary memory accesses. Finally, use may be made of combined hardware/software techniques which are based on memories as presently structured and which associate auxiliary address analyzing and calculating devices therewith, which devices must be passed through in order to access the memory per se. In each of these cases it is common practice to use inexact language referring to "simultaneous" or "instantaneous" access. However, the situation of maximum command parallelism activating a plurality of elementary memory cells (as when accessing a physical memory segment) does not then occur. The concepts explained in patent No. 84 12946 (Aug. 16th, 1984) are extended herein.

SUMMARY OF INVENTION (1) The problem of generating commands.

This is a problem of defining a new memory structure which is accessible via a window of fixed dimensions at any memory location and under conditions of maximum speed. Rather than using existing memory packages, the intention here is to design novel packages. In order to do this, it is necessary to define special methods and devices for generating simultaneous command trains, and applications other than those described herein may be imagined for such methods and devices. These methods and devices are therefore described herein in a self-contained manner. Further, although the technical context of the invention is hardware, this term is used in its widest sense without any a priori limitation to any specific technology. Essentially, in order to implement the methods and devices described, it is necessary to have conventional components for performing binary logic functions, and these may be made in all sorts of technologies: use is thus made of one-way and two-way binary data transmission channels, conventional Boolean devices such as AND gates, OR gates, etc., and functional means of the three-state buffer type which act as on/off switches on the data transmission channels.

BRIEF DESCRIPTION OF DRAWINGS

FIG. 4 shows permutating means Perm(h,h') comprising h' devices of the type Perm(h) and h of the type Perm(h'), for the case where h=h'=4; it is used in the context of problems $P_2(M)$ and $P'_2(M)$, and it is described above.

FIG. 7 is associated with the problem $p'_1$, and represents a device reference DRhN(a)1 of the type DRhN(a) (see above).

FIG. 8 is also associated with problem $p'_1$, and shows a device DRhN(a)2 of the type DRhN(a).

FIG. 10 is associated with problems $P'_1$ or $P'_1(M)$; It shows a device reference DRh(LK)(a)1 as obtained by means of the method Pro'1 in the special case where d=(K/2)−1.

FIG. 11 is associated with the same problem as above and shows a device reference DRh(LK)(a)2 as obtained by means of Pro'1 when d=K−h−1.

FIG. 12 is associated with problems $P'_2$ or $P'_2(M)$; it shows a device reference DR(hh')(KL)(a).

FIGS. 5 to 13 are described below under the heading "embodiments and special devices", after which the advantages of the invention are described.

BEST MODE FOR CARRYING OUT THE INVENTION

Figure 1:
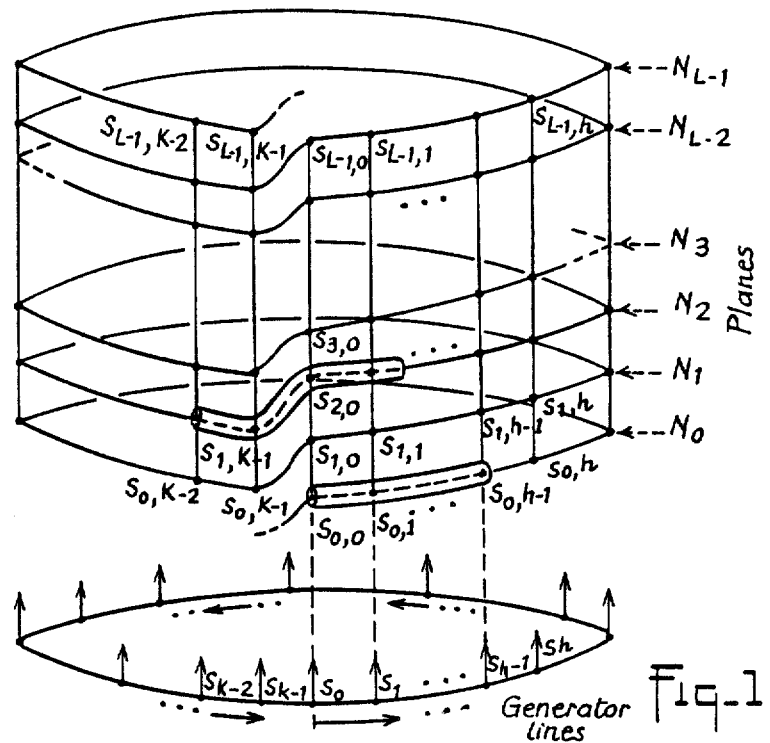
FIGS. 1 and 2 are intuitive images for facilitating understanding of the methods Pro1 and Pro'1; they are described above in the description.

The following description uses the terminology set out below:

A "bus" is a set of binary channels: the state of any one channel is written 0 or 1, (when necessary it will be specified when a third state is applicable, but unless specially mentioned, the third state does not apply). The state of a bus at instant t is defined by the set of states at said instant t of each of the binary channels which constitute the bus.

For any given bus, E(B) denotes the set of possible states for the bus. The term "condition" is used relative to a bus B to denote any subset X of E(B); a condition is true or implemented on B at instant t when the state of B at instant t is one of the elements of X, and this is written X=1 or X(t)=1. A group of conditions is said to be exclusive if the conditions are subsets of E(B) which subsets are pairwise disjoint.

Given n conditions $X_1, X_2, \ldots X_n$, then $X_1$ OR $\ldots$ OR $X_n$ denotes the condition formed by the union of $X_1, X_2, \ldots X_n$, while $X_1$ AND $X_2 \ldots$ AND $X_n$ denotes the condition formed by the intersection of said conditions, while NOT(X) or *X denotes the complement of X.

Methods are described below for constructing new devices from specified devices. Some of these methods are recursive: the devices obtained by these methods may be used in turn by the methods to construct new devices, and so on. In other words, given certain devices which implement functions described below, it is possible to use the methods explained to construct new devices which perform functions described below, and these new devices could optionally be used as the first-mentioned devices above.

In order for such recursive methods to be of practical value, logic requires it to be shown that initial devices exist and can always be constructed, so that the methods described can be applied to existing devices. Two closely related problems are therefore initially described, and it is shown that functional devices satisfying these two problems (written $p_1$ and $p'_1$) always exist and can be constructed. Special cases of such functional devices are described in the portion relating to implementations. Once the existence of devices satisfying $p_1$ and $p'_1$ has been demonstrated, the abovementioned methods using these devices are explained in the usual manner as when describing, for example, a circuit requiring functional components such as decoders, encoders, etc.., or even more complex components, given that the existence or feasibility of such components is assured. The description of the embodiments includes a description of devices obtained by applying the described methods.

The problems $p_1$ and $p'_1$ are now specified.

| Problem $p_1$: |
|---|
| B is a one-way bus. A group of N (+1 optional) exclusive conditions on B are as follows: A(optional), $C_0, C_1, \ldots, C_{N-1}$. Let $\underline{h}$ be an integer satisfying $4 \leq 2h < N$ (e). Let there be N binary commands $S_0, S_1, \ldots, S_{N-1}$. These commands must be activated in accordance with the following specifications: (Iff A = 1, then $S_i = 0$ $\forall i \in [0, N-1]$ (optional) (Iff $C_i = 1$, then $S_{(i+u)(N)} = $ $\forall u \in [0, h-1]$) $\forall i \in [0, N-1]$ |

The notation "Iff" means "if and only if", and $(i+u)(N)$ means $(i+u)$ modulo N. Any device satisfying the above specifications is referred to as being h-slide circular over N, and is written DChNa, DChN, or DChN(a) depending on whether A is required, proscribed, or "don't care".

The problem $p'_1$ is a variant of the above problem: devices which satisfy this problem are referred to as h-slide over N with carry and are written DrhNa, DRhN or DRhN(a) as above.

| Problem $p_2$: |
|---|
| B is a one-way bus. On B there is a group of $N+h-1$ (+1 optional) exclusive conditions, noted: A(optional), $R^-_{N-h+i}$ ($i \in [1, h-1]$), $C_i$ ($i \in [0, N-1]$). $\underline{h}$ satisfies the condition (e) mentioned in $p_1$. There are $N+1$ binary commands $S_0, \ldots, S_{N-1}, R^+$, and these must be activated according to the following specifications: Iff A = 1, then $S_i = 0$ $\forall i \in [0, N-1]$ (optional) (Iff $R^-_{N-h+i} = 1$ then $S_u = 1$ $\forall u \in [0, i-1]$) $\forall i \in [1, h-1]$ (Iff $C_i = 1$ then $S_{i+u} = 1$ $\forall u \in [0, h-1]$) $\forall i \in [1, N-h]$ (Iff $C_{N-h+i} = 1$ then $S_{N-h+i+u} = 1$ $\forall u \in [0, h-i-1]$ |

| -continued |
|---|
| Problem $p_2$: |
| and also $R^+ = 1$) $\forall i \in [1, h-1]$ |

Many devices exist satisfying the functions required for solving $p_1$ and $p'_1$ and this is true regardless of the group of exclusive conditions to be defined on the bus. Anybody who is faimilar with the techniques of Boolean algebra will observe, for example, that it is possible in this case to apply the theorem of canonical decomposition of any logic expression which is a function of Boolean variables comprising logic sums and/or logic products of these variables or of their negations. This suffices for establishing that for a given group of exclusive conditions, it is always possible to provide a circuit having outputs $S_0, \ldots S_{N-1}, R^+$ which are functions of these conditions and take the values 0 or 1 depending on the specifications of $p_1$ or $p'_1$. Naturally, in each particular case, there is no reason for the circuit actually implemented to corresponding exactly to the circuit which is subjacent to the theorem mentioned above. In practice, an effort will be made to take better advantage of the manner in which the group of exclusive conditions is defined on the bus. In describing the embodiments of this invention, devices suitable for solving $p_1$ and $p'_1$ are proposed for certain groups of exclusive conditions.

Use will now be made of devices of the types DChN(a) and DRhN(a), where (a) means that A may be present or absent, for solving four problems referenced $P_1, P'_1, P_2$, and $P'_2$, and set out below. Here again it is necessary to define the terminology which is used: a group of exclusive conditions is written G(K,L,h) when the following situation applies: on the bus B there are K.L+1 conditions, one of which is written A and the others of which are written $C_{ij}$ ($i \in [0, L-1]$ $j \in [0, K-1]$) having the special feature that implementing each of them implies simultaneously implementing a condition $CL_i$ on a portion $B_L$ of B, and a condition $CK_j$ on a portion $B_K$ of B, where $B_L$ and $B_K$ are two totally disjoint portions of the bus and the L conditions $CL_i$ form an exclusive group on $B_L$ while the K conditions $CK_j$ for an exclusive group on $B_K$. h is a number such that $4 \leq 2h \leq K$. A group of exclusive conditions is written G(K,L,h,R) when the following situation applies: there are K.L+h conditions on B, one of which is written A, the h−1 following conditions are written $R^-_{K-h+i}$ for $i \in [1, h-1]$, and the following KL conditions are written $C_{ij}$ ($i \in [0, L-1]$ $j \in [0, K-1]$) and have the same characteristics as mentioned above for the group G(K,L,h). h satisfies $4 \leq 2h \leq K$.

| The problem $P_1$ as follows: |
|---|
| Let there be a bus B, on which a group of conditions G(K,L,h) is defined (see definition above). Let there be K.L binary commands written $S_{ij}$ $i - [0, L-1]$ $j - [0, K-1]$. A circuit must be implemented enabling these commands to be activated in accordance with the following specifications: (i$_1$) Iff A = 1 then $S_{i,j} = 0$ $\forall i \in [0, L-1]$ $\forall j \in [0, K-1]$ (optional) (i$_3$) (Iff $C_{ij} = 1$ then $S_{i,j+u} = 1$ $\forall u \in [0, h-1]$) $\forall i \in [0, L-1]$ $\forall j \in [0, K-h]$ (i$_4$) (Iff $C_{ij} = 1$ then $S_{i,j+u} = 1$ $\forall u \in [0, K-1-j]$ and $S_{i+1,u} = 1$ $\forall u \in [0, h-K+j-1]$) $\forall i \in [0, L-2]$ $\forall j \in [K-h+1, K-1]$ (i$_5$) (Iff $C_{L-1,j} = 1$ then $S_{L-1,j+u} = 1$ $\forall u \in [0, K-1-j]$ and $S_{0,u} = 1$ $\forall u \in [0, h-K+j-1]$ $\forall j \in [K-h+1, K-1]$ |

| The problem $P'_1$ is as follows: |
|---|
| Let there be a bus B, and conditions of the type G(K,L,h,R) |

-continued (see definition above). Let there be K.L+1 binary commands written $R^+$ and $S_{i,j}$ as above. A circuit must be implemented enabling $S_{i,j}$ and $R^+$ to be activated in accordance with the following specifications:
($i_1$), ($i_3$), ($i_4$) as above.
($i_2$) (Iff $R^-_{K-h+i}=1$ then $S_{0,u}=1$ ∀u∈[0,i−1 ) ∀i∈[1,h−1]
($i'_5$) as defined by ($i_5$) with the activation condtions for $S_{0,u}$ omitted and replaced by $R^+=1$.

In addition to these problems, the use of devices of the type DChN(a) and DRhN(a) makes it very easy to solve two other problems set out below:

Problem P'₂

$B_K$ is a one-way bus. A group of K + h − 1 (+1 optional) exclusive conditions are defined and written A(optional), $R^-_{K-h+j}$ (j∈[1,h − 1]), $CK_j$ (j∈[0,K − 1]). There is a similar bus $B_L$ with A'(optional), $R^-_{L-h'+i}$ (i∈[1,h'−1]), $CL_i$ (i∈[0,L−1]). There are K.L + 2 commands $S_{i,j},R_K,R_L$. The activation conditions are to be (4 ≦ 2h ≦ K and 4 ≦ 2h' ≦ L):

$$\begin{cases} \text{Iff } R^-_{L-h'+i}=1 & \forall u\in[0,i-1] \\ \quad\text{then } S_{u,v}=1 \\ \text{and } R^-_{K-h+j}=1 & \forall v\in[0,j-1] \end{cases} \forall i\in[1,h'-1] \text{ and } \forall j\in[1,h-1]$$

$$\begin{cases} \text{Iff } CK_j=1 & \forall u\in[0,i-1] \\ \quad\text{then } S_{u,j+v}=1 \\ \text{and } R^-_{L-h'+i}=1 & \forall v\in[0,\alpha] \end{cases} \forall i\in[1,h'-1] \text{ and } \forall j\in[0,K-1]$$

with α = Min(h − 1,K − 1 − j) and $R^+_K = 1$ iff α = K − 1 − j)

$$\begin{cases} \text{Iff } CL_i=1 & \forall u\in[0,\beta] \\ \quad\text{then } S_{i+u,v}=1 \\ \text{and } R^-_{K-h+j}=1 & \forall v\in[0,j-1] \end{cases} \forall i\in[0,L-1] \text{ and } \forall j\in[1,h-1]$$

with β = Min(h' − 1,L − 1 − j) and $R^+_L = 1$ iff β = L − 1 − j)

$$\begin{cases} \text{Iff } CL_i=1 & \forall u\in[0,\beta] \; \forall i\in[0,L-1] \\ \quad\text{then } S_{i+u,j+v}=1 \\ \text{and } CK_j=1 & \forall v\in[0,\alpha] \; j\in[0,K-1] \end{cases}$$

with α and β as above, and $R^+_K$ and $R^+_L$ activated as above.)
(Iff A or A' = 1 then all commands = 0 (optional) )

Problem P₂:

A group of conditions of the type G(K,L,h) (see description above) is defined on a bus. Let h' be such that 4 ≦ 2h' ≦ L. There is a set of K.L commands which are to be activated as follows:
(Iff A = 1 then all of the commands = 0 (optional) )

$$\begin{pmatrix} \text{Iff } C_{ij}=1 \text{ then } S_{(i+u)(L),(j+v)(K)}=1 & \forall i\in[0,L-1] \\ \forall u\in[0,h'-1] \;\; \forall v\in[0,h-1] & \forall j\in[0,K-1] \end{pmatrix}$$

(i + u)(L) means (i + u) modulo L; likewise for (j + v)(K).

These two problems can be interpreted in the following context: K.L commands are disposed in a two-dimensional field (K×L); the commands in this field as designated by a window of dimensions h×h' are to be activated; in P'₂, account is taken of possible line or column overflow, or both, and in P₂ the field is looped back on itself like a torus.

(2) The solution: beginning with P₁ and P'₁.

In order to solve these problems, we begin with an intuitive image in order to improve understanding of the methods used. Refer to FIG. 1: image that the commands to be activated are disposed in a space on L superposed planes, and that they are disposed circularly in each such plane. The planes are noted $N_0, N_1, \ldots, N_{L-1}$. On the first circle in plane $N_0$, there are the commands $S_{0,0}, S_{0,1}, \ldots, S_{0,K-1}$. On the second circle in plane $N_1$, there are the commands $S_{1,0}, S_{1,1}, \ldots, S_{1,K-1}$, and so on. All of these points in the space are connected by a line and in the following order: $S_{0,0}, S_{0,1}, \ldots, S_{0,K-1}$ (all of plane $N_0$) then moving on from $S_{0,K-1}$ to $S_{1,0}$ in the next plane up $N_1$, and so on. A sleeve of length h is then threaded over the bottom end of the line and is made to slide along the line. The position of the sleeve is identified by its bottom end origin, and the commands which are to be activated are the commands which are covered by the sleeve.

The methods described below make use of the following idea: each of the K generator lines $S_0, \ldots, S_{K-1}$ in the cylinder shown in FIG. 1 can be used to specify the following positions: for $S_j$, the points $S_{i,j}$ (for i∈[0,L − 1). The points $S_j$ form a set of commands which are activated by means of a device of the type DChK(a) (see description above). The corresponding generator lines are then specified for the position j on the base circle. It can then be seen that it is also necessary to specify which are the active planes. When the sleeve lies completely in a single plane $N_i$, only the plane $N_i$ needs to be activated, however, a question arises when the sleeve lies partially in one plane and partially in the next higher plane. The ideal then consists (see FIG. 2) in dividing each of the planes $N_i$ into two sets of commands as follows: $(S_{i,0}, S_{i,1}, \ldots, S_{i,d})$ $(S_{i,d+1}, S_{i,d+2}, \ldots, S_{i,K-1})$. The first set is noted $S'_i$ and the second set $S''_i$, and the points $S_{i,j}$ are disposed in the space as before, except that there are now 2L planes rather than L superposed planes: the points $S'_0$ are located in the first plane, the points $S''_0$ are located in the second plane, the points $S'_1$ are located in the third plane, the points $S''_1$ are located in the fourth plane, and so on.

Figure 2:
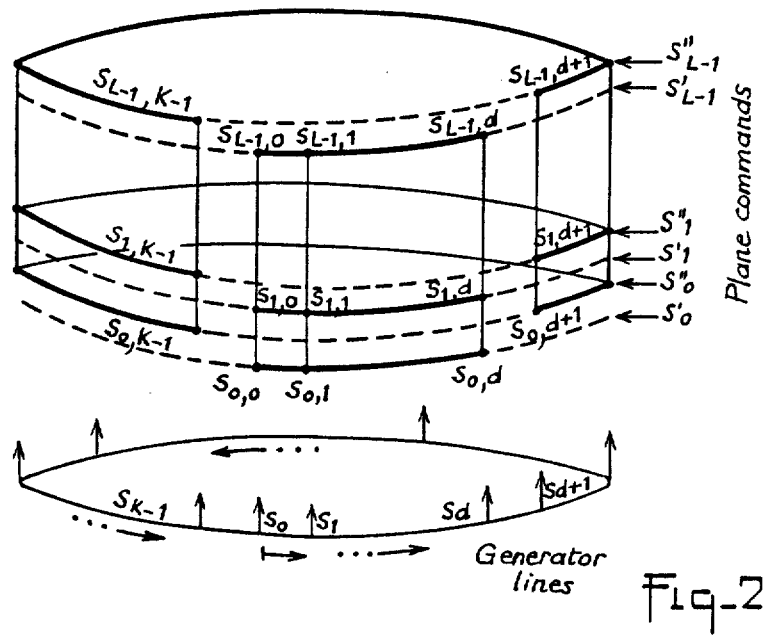

The activation conditions for pairs of planes are shown in FIG. 2 and comprise: for a fixed i, if the position of the sleeve is j, with j∈$S'_i$, in which case $S'_i$ and $S''_i$ are activated, or else j∈$S''_i$ in which case $S''_i$ and $S'_{i+1}$ are activated.

The criterion for splitting commands this way in a single plane remains to be specified. FIGS. 1 and 2 show that when the sleeve straddles two planes, it must be capable of overflowing up to h−1, and this situation will occur both when passing from type S' to type S'' planes and when passing from type S'' to type S' planes. Cutoffs must therefore be provided where d is selected in the space [h−2,K−h].

Once this has been done, it is sufficient to define over the 2L planes $S'_i$ and $S''_i$ (i∈[0,L−1]), activation conditions which are functions solely of the value i and the value j depending on whether or not j belongs to the space [0,d]. A device of the DR2L'(a)(L'=2L) type (see above) or a device of the DC2L'(a) type (see above) will satisfy the desired function depending on whether the command space is to be looped back on itself, or not. A logic AND can then be wired between the generator commands $S_j$ and the plane commands $S'_i$ and $S''_i$:

$S'_i.S_j$  i∈[0,L−1] ∨ j∈[0,d]

$S''_i.S_j$  i∈[0,L−1] ∨ j∈[d+1,K−1].

| Method Pro1 for P₁ |
|---|
| Let P₁ be as described in the P₁ box above using the |

-continued defined notation ((X) means optional X.)
- Let there be conditions: $CK_O$ AND (*A), $CK_1$ AND (*A), ..., $CK_{K-1}$ AND (*A), (A). This group is exclusive: it may therefore be associated with a DChK(a) device in accordance with $p_1$ and having K commands $S_O, ..., S_{K+1}$ which are actuated in accordance with $p_1$ (see above).
- Secondly a number d is selected such that $d-[h-2,K-h]$.
- Then let there be the conditions $D' = CK_O$ OR $CK_1$ OR ... OR $CK_d$ and $D'' = CK_{d+1}$ OR ... OR $CK_{K-1}$. The following group of conditions is then formed: $CL_O$ AND $D'$ AND (*A), $CL_O$ AND $D''$ AND (*A), ..., $CL_{L-1}$ AND $D'$ AND (*A), $CL_{L-1}$ AND $D''$ AND (*A), (A). This group is exclusive, and may therefore be associated in accordance $p_1$ with a device $DC2L'(a),(L'=2L)$ having 2L commands $S'_O, S''_O, S'_1, S''_1, ..., S'_{L-1}, S''_{L-1}$ which are activated in accordance with $p_1$ with $h=2$ and the present conditions.
- These two groups of commands are then wired together with a logic AND thereby forming K.L as follows:
  $S_{i,j} = S'_i \cdot S_j$ ∀i∈[0,L−1] ∀j∈[0,d]
  $S_{i,j} = S''i \cdot S_j$ ∀i∈[0,L−1] ∀j∈[d+1,K−1].

The method Pro'1 for P'₁

Let P'₁ be as described in the P'₁ box above using the defined notation.
- Let there be conditions: $CK_O$ AND (*A), ..., $CH_{K-h}$ AND (*A), and ($CK_{K-h+1}$ AND (*A)) OR $R^-{}_{K-h+1}, ... (CK_{K-1}$ AND (*A)) OR $R_{K-1}$, (A).
This group is exclusive: it may therefore be associated with a DChK(a) device in accordance with $p_1$ and having K commands $S_O, ..., S_{K+1}$ satisfying the specifications of $p_1$ (see $p_1$ box above).
- Secondly a number d is selected such that $d-[h-2,K-h]$.
- Then let there be the conditions D' D'', where $D' = CK_O$ OR ... OR $CK_d$, and $D'' = CK_{d+1}$ OR ... OR $CK_{K-1}$. Let $R^- = R^-{}_{K-h+1}$ OR $R^-{}_{K-h+2}$ OR ... OR $R^-{}_{K-1}$. Let there be the exclusive group:
$CL_O$ AND $D'$ AND (*A), $CL_O$ AND $D''$ AND (*A), ..., $CL_{L-1}$ AND $D'$ AND (*A), $CL_{L-1}$ AND $D''$ AND (*A), $R^-$, (A).
This comes in the scope of p'₁. There therefore exists a device $DC2L'(a),(L'=2L)$ having 2L commands $S'_O, S''_O, S''_1, ..., S'_{L-1}, S''_{L-1}$, and $R^+$ satisfying the specifications of the problem p'₁ (see above).
- These two groups of commands are then wired together with a logic AND, thereby forming K.L+1 as follows:
  $S_{i,j} = S'_i \cdot S_j$ ∀i∈[0,L−1] ∀j∈[0,d]
  $S_{i,j} = S''_i \cdot S_j$ ∀i∈[0,L−1] ∀j∈[d+1,K−1] and $R^+$.

Pro1 and Pro'1 thus define two wiring methods for the problems P₁ and P'₁ respectively. These methods are implemented in various embodiments which are described below, while showing how the above-described groups of conditions can be implemented in an extremely simple manner under certain special cases of definitions for the conditions $CL_i$ and $CK_j$, (which special cases are very common in practice).

Further, it is observed, as mentioned above, that Pro1 and Pro'1 are indeed recursive: it turns out that the devices obtained by means of Pro1 are characterized by the datum of a group of K.L(+1 optional) exclusive conditions: (A) and $C_{ij}$ (each of which corresponds to simultaneously implementing $CL_1$ and $CK_j$). K.L commands $S_{i,j}$ are indeed activated and they are stored in the following order: $S_{0,0} ... S_{0,K-1} ... S_{1,0} ... S_{1,K-1} ... S_{L-1,0} ... S_{L-1,K-1}$. In all, the device obtained in this way is of the type DchN(a) with N=K.L. It may thus, in turn, be used within the method Pro1 as a device in accordance with $p_1$. The same remarks apply to the method Pro'1 which is likewise recursive in the above-explained sense. We now give solutions for P₂ and P'₂.

Method Pro2 for P'₂

Let P'₂ be as described in the P'₂ box above. It is clear that $B_K$ is in the p'₁ type situation (see p'₁ box above). It may thus be associated in accordance with p'₁ with a type DRhK(a) device. $B_L$ is also in a type p'₁ situation so it may be associated with a type DRh'L(a) type device. The commands for the first device are referenced $S_0, S_1, ..., S_{K-1}, R^+{}_K$, and the commands for the second device are referenced $S'_0, S'_1, ..., S'_{L-1}, R^+{}_L$.
The K.L+2 commands required by the solution for P'₂ are then as follows:
  $S_{i,j} = S'_i \cdot S_j$ ∀i∈[0,L−1] ∀j∈[0,K−1]
  together with $R^+{}_K$ and $R^+{}_L$.

Method Pro2 for P₂

Let P₂ be as described in the P₂ box above. The group of conditions (A) and $CK_j$ is associated with a device of type DChK(a), to which the K commands $S_0, ..., S_{K-1}$ correspond. Similarly, the group of conditions (A) and $CL_i$ is associated with a device of the type DCh'L(a) to which the L commands $S'_0, ..., S'_{L-1}$ correspond.
The K.L commands required by the solution for P₂ are then as follows:
  $S_{i,j} = S'_i \cdot S_j$ ∀i∈[0,L−1] ∀j∈[0,K−1]
  (with $S'_i \cdot S_j$ indicating a wired logic AND, both here and in the previous box).

It may be observed that these methods are easily generalized to fields having any number of dimensions greater than 2.

(3) The problem of application to memories.

The above-described methods are implemented in the following context: in order to be integrated, the memories must be made up of elementary cells which are disposed in such a manner as to enable them to be selected by matrix or line/column type techniques. In this case it is necessary to slide a unit of size h through a set of these memory-selection commands which have a matrix configuration. Also, the manner in which the address bus generates the groups of exclusive conditions is quite special and advantage is taken thereof.

These special conditions are now explained with reference to two problems and two variants thereof.

Problem P'₁(M)

This problem is a subproblem of P'₁ (see P'₁ box above).
Let there be a matrix network of K.L elementary memory cells referenced $M_{i,j}$ (i∈[0,L−1] j∈[0,K−1]); let the activation commands for each of these cells be written $CS_{i,j}$. The network is accessed by a bus having k+l+2 binary channels, referenced $R^-, A_O, ..., A_{k-1}, A'_O, ..., A'_{l-1}, A^+$.
$K=2^k$, $L=2^l$, and $h=2^i$ ($4 \leq 2h \leq K$). K.L+h conditions are defined on the bus, and are valid as follows:
$A=1$ when $A^+ = 0$ and $R^- = 0$
$R^-{}_{K-h+j} = 1$ when $A^+ = 0$, $R^- = 1$ and $A_{k-1}, ... A_O$ conveys the binary code of K−h+j. (j∈[1,h−1])
Each of the K.L other situations: $C_{ij} = 1$ (i∈[0,L−1] j∈[0,K−1]) correspond to the situations: $A^+ = 1$, $R^- = 0$, $A_{k-1}, ..., A_O$ conveys the binary code of j, and $A'_{l-1}, ..., A'_O$ conveys the code of i. The commands $CS_{i,j}$ and the command $R^+$ must then be activated in accordance with the spefications described in P'₁ except that the $S_{i,j}$ are replaced with $CS_{i,j}$.

Problem P₁(M)

This is a variant of the above problem and also forms a subproblem to the above-described P₁. Let there be a network of K.L elementary memory cells as above. This network is accessed via a bus having k+l+1 binary channels: $A_O ... A_{k-1} A'_O ... A'_{l-1} A^+$. K, L, and h are defined as above. There are K.L+1 conditions: $A=1$ corresponds to $A^+ = 0$
$C_{i,j} = 1$ corresponds to $A^+ = 1$, $A_{k-1} ... A_O$ conveys the code of j and $A'_{l-1} .. A'_O$ conveys the code of i.
The commands $CS_{i,j}$ must then be activated in accordance with the spefications described in P₁ except that the $S_{i,j}$ are replaced with $CS_{i,j}$.

Problem P'₂(M)

This is a sub-problem of the above-described P'₂. Let there be a network of K.L cells accessed as above via two buses. One of the buses has k+2 channels: $R^-{}_K, A_O, ..., A_{k-1}, A^+$, and the -continued other, has 1+2 channels $R^-_L$, $A'_0, \ldots, A'_{l-1}, A'_+$. $K=2^k$, $L=2^l$, $h=2^t$, and $h'=2^{t'}$. ($4 \leq 2h \leq$] K and $4 \leq 2h' \leq L$). With reference to the notions of P'$_2$:

A or A'=1 corresponds to ((A'+ =O AND $R^-_L$=O) OR (A+ AND $R^-_K$=O)) $R^-_{K-h+j}$=1 corresponds to: A+ =O, $R^-_K$=1, $A_{k-1}, \ldots, A_0$ *conveys the binary code of* j.
$R^-_{L-h+i}$=1 corresponds to: A'+ =O, $R^-_L$=1, $A'_{l-1}, \ldots, A'_0$ conveys the binary code of i.
$CK_j$=1 corresponds to: A+ =1, $R^-_K$=O, $A_{k-1}, \ldots, A_0$ conveys the binary code of j.
$CL_i$=1 corresponds to: A'+ =O, $R^-_L$=1, $A'_{l-1}, \ldots, A'_0$ conveys the binary code of i.
Memory select commands must then be activated together with two commands $R^-_K$, $R^-_L$ in accordance with the specifications described in P'$_2$ with the $S_{i,j}$ representing the memory cell select commands $M_{i,j}$.

| Problem P$_2$(M) |
| --- |
| This is a variant of the above problem and forms a sub-problem of the above-described P$_2$. A network of K.L cells as above has one bus with k+1 channels: $A^+, A_0, \ldots, A_{k-1}$ and another bus with l+1 channels: $A'+, A'_0, \ldots, A'_{l-1}$. A=1 corresponds to $A^+$=O or A'+ =O $C_{ij}$=1 corresponds to $A^+$=1, A'+ =1, $A_0, \ldots, A_{k-1}$ and $A'_0, \ldots, A'_{l-1}$ conveying the codes j and i respectively. The memory cell commands must then be activated using the specifications described in P$_2$, where the $S_{i,j}$ are the commands for cells $M_{i,j}$. |

Naturally, since these problems are sub-problems of those mentioned above, we already know that they can be solved by applying the methods Pro1, Pro'1, Pro2, and Pro'2. However, in these special cases particularly suitable devices are described.

In addition, it must be mentioned that a new question arises: when h consecutive cells are activated (P$_1$(M) and P'$_1$(M) or h.h' (P$_2$(M) and P'$_2$(M)), regardless of whether a read or a write operation is taking place, it is necessary for the corresponding data to be conveyed between the system and the outside, and the connection of a data bus to the memory cells is therefore also described.

Consider the case of P$_1$(M) and P'$_1$(M). The cells are reference $M_{i,j}$ (i∈[0,L−1]j∈[0,K−1]), and the data bus is referenced $D_0, D_1, \ldots D_{h-1}$. If the cells are connected to the bus as follows: $M_{i,j}$ connected to $D_{h-1-v}$ (v=(J modulo h)), i.e. as in a conventional architecture, it can be seen that for accesses whose address portion corresponding to $A_{k-1}, \ldots, A_0$ is a multiple of h, the order of the data bits on the bus corresponds to the order naturally defined by the network and this may be symbolized as follows: $M_{i,j} \leq M_{i',j'}$ is equivalent to $$\begin{pmatrix} \text{either} & i < i' \\ \text{or} & i = i' \text{ and } j \leq j'. \end{pmatrix}$$

However, if the address portion $A_{k-1} \ldots A_0$ has a remainder q when divided by h, then the order of the data bits on the bus is modified. An address may therefore be represented by a couplet i,mh+q. The corresponding initial position is situated at the (i+1)-th line, and at the (mh+q+1)-th column of the matrix network. We know that the h cells starting at $M_{i,j}$ will have been selected in the order defined above. However, it is necessary to have the following disposition on the bus as shown in the left-hand portion of the following table when in fact the disposition available is that shown in the right-hand portion of the table:

TABLE I

| | | | |
| --- | --- | --- | --- |
| $D_{h-1}$ | $M_{i,mh+q}$ | $D_{h-1}$ | $M_{i,(m+1)h}$ |
| $D_{h-2}$ | $M_{i,mh+q+1}$ | $D_{h-2}$ | $M_{i,(m+1)h+1}$ |
| — | — | — | — |
| — | — | $D_{h-q}$ | $M_{i,(m+1)h+q-1}$ |
| — | — | $D_{h-q+1}$ | $M_{i,mh+q}$ |
| $D_q$ | $M_{i,mh+h-1}$ | — | — |
| $D_{q-1}$ | $M_{i,(m+1)h}$ | — | — |
| — | — | — | — |
| — | — | — | — |
| $D_0$ | $M_{i,(m+1)h+q-1}$ | $D_0$ | $M_{i,mh+h-1}$ |

It can immediately be seen that the disorderings which occur on the bus are h circular permutations (including identity), each of which is associated with a value of q lying between 0 and h−1. Permutating means are thus used to provide the solution.

Remark 0:

In table I, no mention is made of situations where the h consecutive cells overlap the end of one line of the network and the beginning of the next line. The reason for this is that since h is divisible into K, the resulting situations give rise merely to a change of line, and the addresses associated with the columns continue to determine permutations on the data bus which match the above description. The same is true when there is a carry into the beginning of the first line of the network or an overflow from the end of the last line of the network. The solution explained below is no way limited by such "edge" conditions.

Now consider cases P$_2$(M) and P'$_2$(M). The problem of data bit disordering now takes place in a more complex manner: it is now necessary firstly to select a method of linking the cells to the data bus which comprises, in this case hh' channels, and secondly and as a function of the preceding selection, to rearrange the data bits depending on the specified address.

(4) The solution for an application to memories.

When activating memory cell commands, it is shown above that all the problems encountered are sub-problems of those described and referenced P$_1$, P'$_1$, P$_2$, and P'$_2$, and methods have been given for solving these problems in general terms. Specific examples are given in the portion describing specific embodiments. We are thus solely concerned, here, with the question of linking the cells to the data bus and with rearranging the data bits. Let us look at P$_2$(M) and P'$_2$(M): the cells are connected to the data bus in the following manner: $M_{i,j}$ linked to $D_{h'-1-u,h-1-v}$ with u=(i modulo h') and v=(j modulo h); the data bus comprises hh' channels designated in this manner with u∈[0,h'−1] and v∈[0,h−1]. This selection has the advantage of considerably simplifying the problem of rearranging data bits: an address is written, in this case (m'h'+q', mh+q), where q' is the remainder given by the line address after division by h', and q is the remainder of the column address after division by h. Thus, for a given address i,j (and ignoring any possible overflows since they do not present a problem), h' lines are selected and in each of them a group of h cells is selected having the feature of being disordered in a manner specified by the value of q. This disordering is exactly as described in table I. The same circular permutation is therefore provided on the h' bus parallel connections $D_{u,0}, D_{u-1} \ldots D_{u,h-1}$ (u∈[0,h'−1]).

Now consider the h parallel bus connections: $D_{0,v}, D_{1,v}, \ldots, D_{h'-1,v}$ (v∈[0,h−1]). The h' appropriate data bits are then present on each of them, with each group of h' being disordered in accordance with the same circular permutation as specified by the value of q'. We are thus in a situation identical to that described by table I with the letters i, m, h, and q, being replaced by the letters i', m', h', and q'. The same circular permutation then needs to be performed as specified by q' for h above-specified parallel bus connections.

Figure 3:
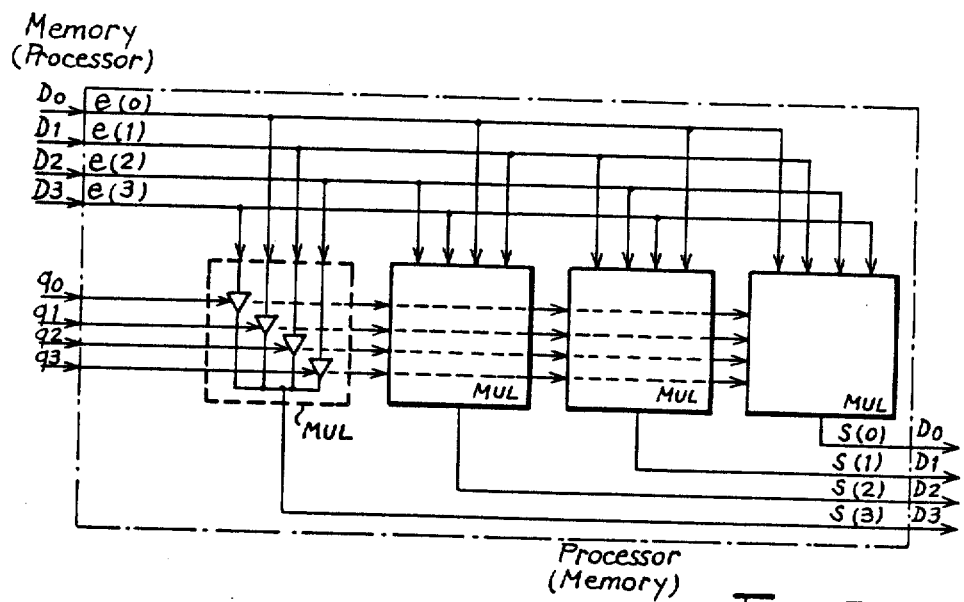
FIG. 3 shows permutating means Perm(h) for the case when h=4, and providing 4 circular permutations:
$(D_3D_2D_1D_0 \rightarrow D_3D_2D_1D_0$ (q=0));
$(D_0D_3D_2D_1 \rightarrow D_3D_2D_1D_0$ (q=1));
$(D_1D_0D_3D_2 \rightarrow D_3D_2D_1D_0$ (q=2));
$(D_2D_1D_0D_3 \rightarrow D_3D_2D_1D_0$ (q=3));
This device is described above.

Let Perm(h) be a device having h inputs $e(0), \ldots, e(h-1)$, and h outputs $s(0), \ldots, s(h-1)$, and h commands written $q_0, \ldots, q_{h-1}$, which when activated by the command $q_i$ performs the following permutation: $e(h-i-1), e(h-i-2), \ldots, e(0), e(h-1), \ldots, e(h-i)$ $s(h-1), s(h-2), \ldots, s(i), s(i-1), \ldots, s(0)$ Such devices are known. They can be implemented solely by using three-state buffers are shown in FIG. 3 which relates to the wiring for the case when $h=4$.

For the problems $P_1(M)$ and $P'_1(M)$ we therefore proceed as follows:

Each memory cell $M_{i,j}$ is connected to channel $D_{h-1-v}$ ($v=(j \text{ modulo } h)$) of the data bus, and in addition a device Perm(h) is placed on this bus (which may optionally be doubled if both reading and writing is to take place), which device has inputs e(i) which are connected to the channels $D_i$ coming from the memory, and outputs s(i) which are connected to the outside (there may optionally be another device Perm(h) for writing purposes, in which case its inputs are connected to the outside of the system and its outputs constitute the data bus leading to the memory). The question of controlling the commands applied to Perm(h) is left to the circuit designer: for example, in a first stage, a device may be installed on the portion $A_{t-1}, \ldots, A_0$ of the address bus to calculate the remainder q of the address after division of h, and the outputs from said remainder device would constitute the commands for Perm(h). However, it may be observed that if control of these commands is left to the processor, the available options are increased for the very reason that the permutation selected on the bus need not be imposed by the value of the address.

It may be observed that it is also possible to omit permutating means on the data bus by requiring the processor to rearrange data bits, if necessary, after reading them or prior to writing them.

So far this specification is silent on questions relating to writing and reading. These questions have immediate solutions: when a group of h is selected, the network also receives a simultaneous instruction of the type R/*W in conventional manner. When the data bus is a two-way bus, it is provided twice over and permutating means are placed on each branch thereof, one for permutations in the direction memory to the outside and the other in the opposite direction, with the R/*W signal inhibiting one or other of them as appropriate.

These techniques are familiar to the person skilled in the art.

For $P_2(M)$ and $P'_2(M)$ we proceed s follows: each memory cell $M_{i,j}$ is connected to the channel $D_{h'-1-u,h-1-v}$ ($u=(i \text{ modulo } h')$ $v=(j \text{ modulo } h)$) of the data bus having hh' channels referenced $D''_{x'x}$ ($x' \in [0,h'-1]$ $x \in [0,h-1]$). Each of the h' parallel bus connections referenced $D_{u,h-1}, \ldots, D_{u,0}$ ($u \in [0,h'_1]$) goes to a device Perm(h), having h commands $q_0, \ldots, q_{h-1}$, having outputs referenced $I_{u,h-1}, \ldots, I_{u,0}$, and serving to permutate its inputs towards its outputs as follows: (for the command $q_j$) $(D_{u,h-j-1} D_{u,h-j-2} \cdots D_{u,0} D_{u,h-1} D_{u,h-j}) \rightarrow (I_{u,h-1} I_{u,h-2} \cdots I_{u,0})$.

Each of these h' devices has the same command $q_j$. Each of the h parallel bus connections referenced $I_{h'-1,v}, \ldots, I_{0,v}$ ($v \in [0,h-1]$) reaches a device Perm(h'), having h' commands $q'_0, \ldots, q'_{h'-1}$ whose outputs are referenced $J_{h'-1,v}, \ldots, J_{0,v}$, and serving to perform the following permutations between its inputs and its outputs: (for the command $q'_i$) $(I_{h'-i-1,v} \cdots I_{0,v} I_{h'-1,v} \cdots I_{h'-i,v}) \rightarrow (J_{h'-1,v} \cdots J_{0,v})$ Each of these h devices has the samme command $q'_i$.

All that remains to be done is to connect to the channels $J_{x'x}$ to the channels $D_{x'x}$ of the bus leading away from the system. The device obtained in this way performs h Perm(h') and h'Perm(h) and is referenced Perm(h,h'). Its commands are couplets $q_x q'_x$ and their control is left to the circuit designer for the reasons mentioned above. If both reading and writing are to be performed, the bus $D_{x'x}$ is provided twice over and suitable permutating means Perm(h,h') pointing in the appropriate direction are placed on each branch and are inhibited by the signal R/*W as mentioned above.

It may be observed that generalization to dimensions greater than 2 is performed easily. Finally, it is possible to omit any given permutating means by leaving the processor the task of rearranging data bits after reading them or of arranging data bits before writing them.

Remark 1.

We return to method Pro'1 (see above) and to a device obtained using this method. Suppose that the command R+ generated by the device DR2L'(a) is slaved to the condition R− so that R− and R+ are equivalent. It is then observed that the commands $S_{i,j}$ are activated in accordance with the specifications imposed for $P_1$ since there is no longer any need to distinguish between the carry-in condition and the carry-out condition, since the device is looped back on itself. This remark shows the method Pro'$_1$ may also be used as a solution for $P_1$. This is made use of in the embodiments. Analogous remarks may be made about method Pro'2 and the problem $P_2$.

Remark 2.

There are several mentions in the French text of the type "(cf P.x, li.y)" which refer back to a specific page and line numbers in the French text. In this English translation they are replaced by mentions of the form "see . . . above", since the page and line numbering do not correspond exactly.

Remark 3.

When defining the command activation conditions in the description of the problems, those which should be set to 1 are specified; it should be understood that those which are not mentioned are set to 0.

EMBODIMENTS. SPECIAL DEVICES

Device DChN(a)1

The problem is the above-described problem $p_1$. B is constituted by N binary channels $C_0, \ldots, C_{N-1}$. The implementation of each of the conditions of the exclusive group corresponds to ($C_i=1$ and $C_j=0$  $j \neq 1$) $i \in [0,N-1]$, and the inactivation condition A may optionally be implemented for $C_i=0$  $i \in [0,N-1]$. The channels $C_i$ are therefore ORed together as follows: (with the symbol + between 2 channels $C_i$ meaning OR):

$$S_i = C_{i-h+1} + C_{i-h+2} + \ldots + C_i \quad \forall i \in [h-1, N-1] \quad (E1)$$

$$S_i = C_{N-h+i+1} + \ldots + C_{N-1} + C_0 + \ldots + C_i \\ \forall i \in [0, h-2] \quad (E2)$$

Figure 5:
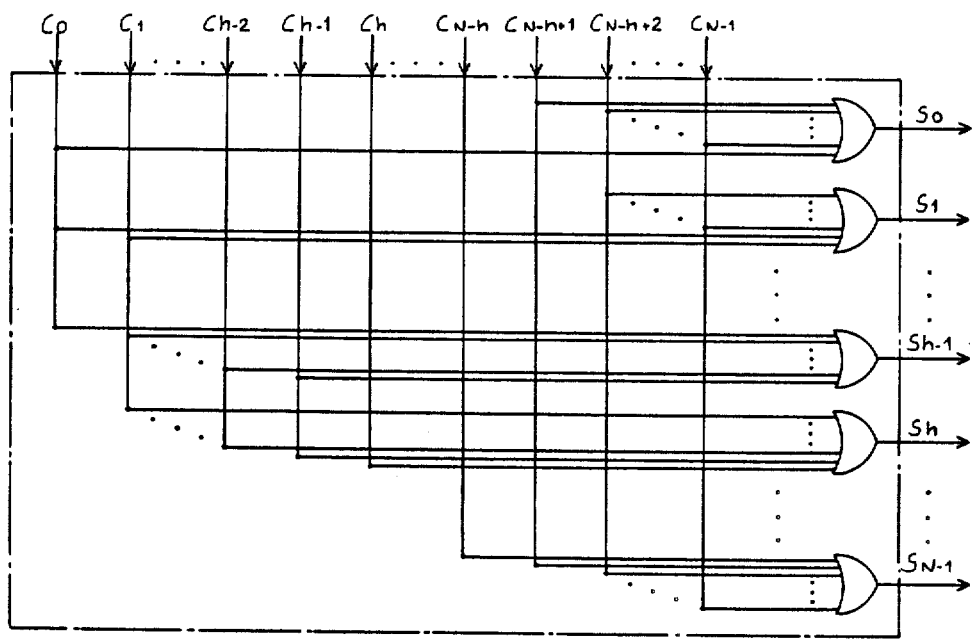
FIG. 5 is associated with problem $p_1$; it shows a device referenced DChN(a)1, of the type DChN(a) (see above).

FIG. 5 shows such a circuit.

Device DChN(a)2

Figure 6:
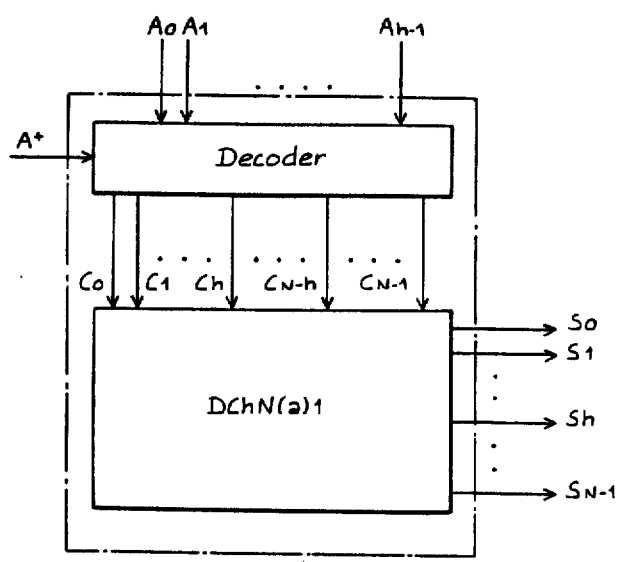
FIG. 6 is also associated with the problem $p_1$ and shows a device DChN(a)2 of the type DChN(a).

The problem is $p_1$. B is constituted by n+1 binary channels $A_{n-1}, \ldots, A_0, A^+$ ($N=2^n$). The optional condition A is true for $A=0$, and the N other conditions are provided by the $2^n$ binary codes conveyed by $A_{n-1}, \ldots, A_0$. All that is then required is for the channel $A^+$ to be the chip select signal for a $n \times 2^n$ decoder whose outputs constitute the inputs to the above-described device DChN(a)1. FIG. 6 shows a suitable circuit.

Device DRhN(a)1

The problem is $p'_1$ (as described above). B comprises $N+h-1$ binary channels referenced $R^-_{N-h+1}, \ldots, R^-_{N-1}, C_0, \ldots, C_{N-1}$. Each of the conditions specified in $p'_1$ is implemented by setting a single one of the channels to 1, and inactivation corresponds to all of the channels being set to 0. All of the channels are therefore ORed together as follows:

$$S_i = C_{i-h+1} + C_{i-h+2} + \ldots + C_i \quad \forall i \in [h-1, N-1] \quad (E3)$$

$$S_i = R^-_{N-h+i+1} + \ldots + R^-_{N-1} + C_0 + \ldots + C_i$$
$$\forall i \in [0, h-2] \quad (E4)$$

$$R^+ = C_{N-h+1} + \ldots + C_{N-1} \quad (E5)$$

FIG. 7 shows such a device.

Device CRhN(a)2

The problem is $p'_1$. B comprises $N+2$ binary channels $A^+, R^-, A_{n-1}, \ldots A_0$. The optional inactivation condition is implemented by $A^+=0$ and $R^-=0$, with the carry conditions corresponding to $R^+=0$, $R^-=1$, $A_{t-1}, \ldots, A_0$ conveying the binary code of a number in the range 1 to $h-1$, and with the N other conditions being provided for $A^+=1$, $R^-=0$, and $A_{n-1}, \ldots, A_0$ conveying the code of a number in the range 0 to $N-1$. ($N=2^n$ and $h=2^t$). A t by h decoder is then associated with the channels $A_{t-1}, \ldots, A_0$, with outputs referenced $R^-_{N-h}, R^-_{N-h+1}, \ldots, R^-_{N-1}$ which correspond to the value $0, 1, \ldots h-1$ conveyed by $A_{t-1}, \ldots A_0$. This decoder D' is selected by the channel $R^-$. Subsequently, an n by $2^n$ decoder D is associated with channels $A_{n-1}, \ldots, A_0$ and is selected by $A^+$. Its commands $C_0, \ldots, C_{N-1}$ are associated with address values 0 to $N-1$. The channel $R^-_{N-h}$ is then left "floating" and the chanels $R^-_{N-h+1}, \ldots, R^-_{N-1}, C_0, \ldots, C_{N-1}$ are used as inputs to a DRhN(a)1 device as described above.

FIG. 8 shows the resulting device.

Device DCh

The problem is again $p_1$ for the case where a window of width h is to slide through a field of twice the size. $h = 2^t$ and there are $t+1$ binary channels which constitute the bus B, $A_t A_{t-1} \ldots A_0$. Inactivation never takes place and each of the other conditions are implemented by binary codes conveyed by $A_t A_{t-1} \ldots A_0$. A t by h decoder is inserted on channels $A_{t-1} \ldots A_0$. The decoder is always selected and its outputs are referenced $C_0 \ldots C_{h-1}$. The following circuit wiring is then provided:

$$S_i = A_t \text{ XOR } (C_0 + C_1 + \ldots + C_i) \quad \forall i \in [0, h-1] \quad (E6)$$

$$S_{h+i} = \text{NOT}(S_i) \quad \forall i \in [0, h-1] \quad (E7)$$

Figure 9:
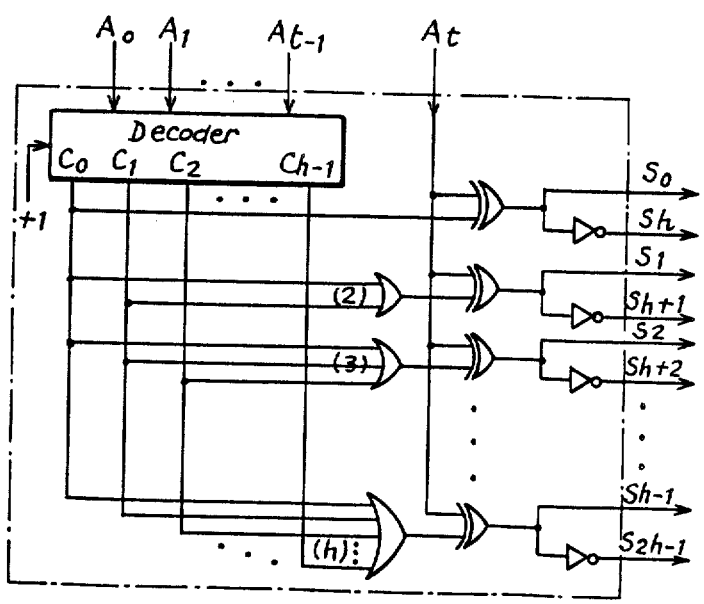
FIG. 9 is associated with $p_1$ and shows a device reference DCh of the type DChN for the special case where N=2h.

FIG. 9 shows such a device.

Device DRh(LK)(a)1

The problem is $P'_1(M)$ (as described above). The method Pro'1 is applied (as above). The notation defined in the above-mentioned boxes is used again here and reference should be made to said boxes. It is recalled how the following conditions are implemented:

There are $k+1+2$ binary channels: $R^-, A_{k-1}, \ldots A_0, A'_{l+1}, \ldots A'_0, A^+$.

$A = 1$ corresponds to: $A^+=0$, $R^-=0$.

$R^-_{K-h+j} = 1$ coresponds to $A^+=0$, $R^-=1$, $A_{k-1} \ldots A_0$ conveys the binary code of $K-h+j$, for $j \in [1, h-1]$.

$C_{ij} = 1$ corresponds to: $A^+=1$, $R^-=0$, $A_{k-1} \ldots A_0$ and $A'_{l-1} \ldots A'_0$ respectively convey the codes for j and i. In accordance with Pro'1 the following conditions need to be taken into consideration $CK_j$ for $j \in [0, K-h]$ and $(CK_{K-h+j} \text{ OR } R^-_{K-h+j})$. It is observed that $A_{k-1} \ldots A_0$ conveys the code of j, i.e. j(K) and the notation i(L) is defined analogously. Since *A is optional, it is ignored here and it can then be observed that: $(CK_{K-h+j} \text{ OR } R^-_{K-h+j}) = ((K-h+j)(K))$ OR $((*A^+ \text{ AND } R^-) \text{ AND } (K-h+j)(K))$ Whence $(CK_{K-h+j} \text{ OR } R^-_{K-h+j}) = (K-h+j)(K)$ This is very precisely a $p_1$ type situation as specified when explaining the device DChN(a)2 (see above).

The command for selecting the DChN(a)2 decoder (in this case $N=K$) and having inputs $A_{k-1} \ldots A_0$ is set to 1 in this case.

Remark 4.

Although *A is optional, this may be taken into account and the resulting device is the same except that the decoder select command is controlled by $A^+$ and $R^-$.

We continue in accordance Pro'1. d is selected to be equal to $(K/2)-1$ in this case. The condition $D'=CK_0$ OR ... OR $CK_d$ is then satisfied when an address lying in the range 0 to $(K/2)-1$ occurs on $A_{k-1} \ldots A_0$, and the condition D" is satisfied otherwise. This is provided in practice by the state of the channel $A_{k-1}$ which is 0 in the first case and 1 in the second case. Also, it is clear in this case, that the union of conditions $R^-_{K-h+j}$ is the condition *A+ AND R⁻. Still in accordance with Pro'1 account must now be taken of the conditions: *A+ AND R⁻, A, and the conditons $CL_i$ AND *A AND D' together with the conditions $CL_i$ AND *A AND D". In the present case $CL_i$ and *A AND D' is true when i(L), $A_{k-1}=0$, $A^+=1$ and $R^-=0$. This is thus exactly a situation of the type $p'_1$ specified in the description of device DRhNa2 (see above) which is further simplified in the present case by virtue of the fact that sliding takes place in pairs so that the decoder D' in this device takes the degenerate form of the sole command $R^-$. Overall, $A_{k-1}, A'_{l-1}, \ldots, A'_0$ form the inputs to a decoder activated by $A^+$. The channel $R^-$ and the 2L outputs from the decoder then form the inputs to a DR2L'(a)1 device (see above), with the overall assembly constituting a DR2L'(a)2 device as mentioned above. In this case $L'=2L$. The circuits are thus ANDed in accordance Pro'1.

FIG. 10 shows the DRh(LK)(a)1 device as described above.

Device DRh(LK)(a)2

This device is shown in FIG. 11. The problem is of the $P'_1$ type and may also be interpreted in the context of $P'_1(M)$.

The system is accessed via K+L+1 binary channels: $R^-$, $CK_0, \ldots, CK_{K-1}, CL_{L-1}, \ldots, CL_0$. A=1 corresponds to $(CK_j=0 \text{ Vj})$ OR $(CL_i=0 \text{ Vi})$.

$R^-_{K-h+j}=1$ corresponds to $R^-=1$, $CK_{K-h+j}=1$ and all other channels are 0.

$C_{ij}=1$ corresponds to $R^-=0$, $CL_i=1$, $CK_j=1$, and all other channels 0.

Pro'1 is applied exactly as done above: $CK_j$ AND *A=$CK_j$ by virtue of the definition of A and $CK_j$.

$(CK_{k-h+j}$ AND *A) OR $R^-_{K-h+j}=CK_{K-h+j}$ OR $(R^-$ AND $CK_{K-h+j})$ and thus $=CK_{K-h+j}$ This is thus a p'$_1$ type situation as specified when describing device DChK(a)1 (see above). The channels $CK_{k-1}, \ldots, CK_0$ are thus applied to such a device and the outputs of said device are $S_0, \ldots, S_{K-1}$.

d is selected in accordance with Pro'1 as follows: d=K−h−1; in this case the fact that D'−1 means that the channel $S_{K-1}$ is 0 and that it is 1 when D''=1. The following conditions then need to be formed: $R^-$ (since the union of $R^-_{k-h+j}$ is equal to $R^-$ in this case) and $CL_i$ AND *A AND D' together with $CL_i$ AND *A AND D'', and A.

However, in the present case $CL_i$ AND *A AND $D'=CL_i$ AND *$S_{K-1}$. The following 2L conditions are thus provided: $CL_i.S_{K-1}$ and $CL_i.*S_{K-1}$. The 2L channels obtained and the channel $R^-$ then form the input to a DR2L'(a)1 device of the DRhN(a)1 type associated with problem p'$_1$ as explained above. The outputs of this device then need wiring in a logic AND with the outputs $S_j$ from the previous device as explained in Pro'1.

In order to interpret the above in accordance with P'$_1$(M), $CK_j$ and $CL_i$ should be considered as being outputs from line and column decoders.

Device DR(hh')(KL)(a)

This device is shown in FIG. 12. The problem is P'$_2$(M) as explained above) and method Pro'2 is applied (as explained above). The method is immediately applicable: each of the line and column buses is associated with a device of the DRhN(a)2 type (as above), with one of the buses (the column bus) having the value h, and the other (line bus) having the value h', and the outputs are wired in a logical AND as specified by Pro'2.

Remark 5.

By using remark 1 above it may be observed that the problems P$_2$(M), and P$_1$(M) are solved as are similar problems. In the above-described devices DR(hh')(KL)(a), DRh(LK)(a)2, DRh(LK)(a)1, DRhN(a)2, the devices only need to be looped back on themselves, i.e. the carry conditions can be eliminated by making the following connections for the above-mentioned devices respectively: $R^+_L$ to $R^-_L$ and $R^+_K$ to $R^-_K$, $R^+$ to $R^-$, $R^+$ to $R^-$ and $R^+$ to $R^-$.

Remark 6.

In the above description it will be observed that positive logic is used throughout. Thus, for example, the decoders are selected for commands having logic 1 values, but opposite logic could apply. There is no special restriction to positive logic.

APPLICATIONS AND ADVANTAGES OF THE INVENTION

Applications to memories have already been mentioned. It may be added that the methods and devices are suitable for integration. A particular application (ante-memories) is with very high performance static RAMs; it has been observed that the devices described, for example with reference to FIGS. 10, 11 and 12 have a structure such that firstly the time for selecting a sequence of cells differs from that of a conventional memory solely by the time taken to pass through one OR gate, and secondly that the question of organizing the memory in a matrix is solved. Further, the advantages offered by the possibility of sliding are obvious since everything that can be done with prior structures continues to be possible, and new possibilities are now offered. It may also be observed that in all problems where it is necessary to inspect the vicinity of a point, the devices described provide considerable help. Finally it is observed that memory packages which may be optionally integrated in accordance with the methods described can be immediately assembled to one another with the $R^+$ of one being connected to the $R^-$ of the next.

Remark 7.

Reference has been made several times in the description to an optional condition referenced A which is not essential in any way and whose implementation merely represents the special case of selecting an empty set of commands.

Figure 13:
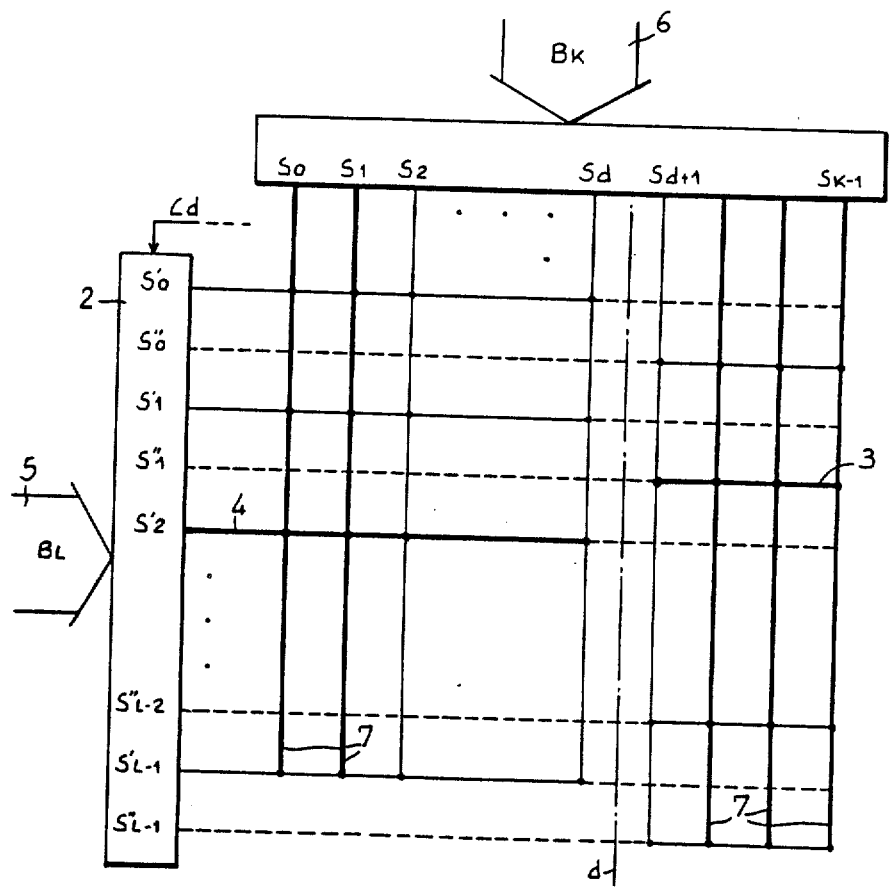
FIG. 13 is associated with the problem P1 and p'1; it shows a device referenced DCh and DC2 wherein h commands are activated.

FIG. 13 provides an image for helping to understand the solution to problems of types P$_1$ and P'$_1$. A basic device 1 of the type DCh receives a portion of the activation condition via a channel $B_K$ (6), which determines simultaneous activation of h successive columns (7) in circular order. Simultaneously, another basic device 2 of the type DC2 or DRL receives firstly another portion of the activation condition via a channel $B_L$ (5), together with an indication Cd whether a certain column number (d) has been passed through or not, which determines the simultaneous activation of two portions of the lines: the first portion 3 is selected from a set which is interconnected with a portion of the column. A second portion 4 is selected in a set which is interconnected with the remainder of the columns. Thus, at each instant either two line portions of the same rank S'$_i$ and S''$_i$ are activated or else two line portions of different ranks S''$_i$ and S'$_{i+1}$ are activated so that in either case exactly h commands are activated (ignoring overflow situations).

To sum up, the present invention provides a device for activating a certain number of commands taken as function of a selection condition from a set of commands organized in a matrix. According to the invention, in order to activate a submatrix of not more than h.h' commands simultaneously and in parallel from within the matrix of K.L commands and regardless of the position of the submatrix therein, where h, h', K and L are numbers such that $4 \leq 2h \leq K$ and $4 \leq 2h' \leq L$, it comprises:

a set of K.L means interconnecting K column commands ordered from 0 to K−1 and referenced $S_0, \ldots, S_j, \ldots, S_{K-1}$, and L line commands ordered from 0 to L−1 and referenced $S'_0, \ldots, S'_i, \ldots, S'_{L-1}$ in accordance with logic functions S'$_i$ and S$_j$, with the outputs of said means corresponding biuniquely to the set of K.L matrix-organized commands;

first activation means for the column commands, which first activation means select and simultaneously activate in parallel a first column command and the following not more than h−1 column commands on receiving a first signal representative of a portion of the selection condition and designating said first column command to be activated; and second activation means for the line commands, which second activation means select and simultaneously activate in parallel a first line command and the following not more than $h'-1$ line commands on receiving a second signal representative of another portion of the selection condition and designating said first line command to be activated, said second signal being received at the same time as the first means receives its signal.

The first means may also operate in a circular mode such that in column command numbering order, the last column command $S_{K-1}$ is followed by the first column command $S_0$, and exactly $h-1$ column commands are activated.

The second means may operate in a circular mode such that the line command numbering order, the last line command $S_{L-1}$ is followed by the first line command $S_0$, and exactly $h'-1$ line commands are activated.

According to another characteristic of the invention, in order to enable a mode of operation with column carry, the first means further include:

a carry-out channel $R^+_K$, for connection outside the device, said channel transmitting an overflow-indicating signal from the activated submatrix towards another, similar device in the column direction whenever the number of the first activated column command is greater than or equal to $K-h+1$; and a carry-in channel $R^-_K$, for receiving a signal from outside the device indicative of overflow from another similar device, said signal then being combined with the first signal so as to give the exact number of column commands to be activated, starting with the firsst $S_0$.

The same may be provided to enable a mode of operation with line carry, the second means further include:

a carry-out channel $R^+_L$, for connection outside the device, said channel transmitting an overflow-indicating signal from the activated submatrix towards another, similar device in the line direction whenever the number of the first activated line command is greater than or equal to $L-h'+1$; and a carry-in channel $R^-_L$, for receiving a signal from outside the device indicative of overflow from another similar device, said signal then being combined with the second signal so as to give the exact number of line commands to be activated, starting with the first $S'_0$.

In a particular embodiment of a device operating with line carry and with column carry, including a first input address bus $A^+$, $A_{k-1} \ldots A_{t-1} \ldots A_0$, where $h=2^t$ and $K=2^k$, said first bus delivering the first signal, and a second address bus $A'^+$, $A'_{l-1} \ldots A'_{t'-1} \ldots A'_0$, where $h'=2^{t'}$ and $L=2^l$, said second bus delivering the second signal, the carry-in channel of the first means is a simple binary channel $R^-_K$;

the carry-in channel of the second means is a simple binary channel $R^-_L$;

the first means is implemented as follows:

it includes a first decoder which is activated when $R^-_K$ transmits an overflow signal, said decoder having the channels $A_{t-1}, \ldots, A_0$ as inputs and having $h$ commands referenced $R^-_{K-h}$, $R^-_{K-h+1}, \ldots R^-_{K-1}$ as outputs; and it includes a second decoder which is activated when $A^+=1$, said decoder having the channels $A_{k-1} \ldots$ ., $A_0$ as inputs and having K commands referenced $C_0, \ldots, C_{K-1}$ as outputs;

with the column activation commands being wired in accordance with the following logic equations:

$S_j = C_{j-h+1} + \ldots + C_j$ for j varying from $h-1$ to $K-1$ (end values included); and $S_j = R^-_{K-h+j+1} + \ldots + R^-_{K-1} + C_0 + \ldots + C_j$ for j varying from 0 to $h-2$ (end values included);

the second means is implemented as follows:

it includes a first decoder which is activated when $R^-_L$ transmits an overflow signal, said decoder having the channels $A'_{t'-1}, \ldots, A'_0$ as inputs and having $h'$ commands referenced $R^-_{L-h'}$, $R^-_{L-h'+1}, \ldots R^-_{L-1}$ as outputs; and it includes a second decoder which is activated when $A'^+=1$, said decoder having the channels $A'_{l-1} \ldots$ ., $A'_0$ as inputs and having L commands referenced $C'_0, \ldots, C'_{K-1}$ as outputs;

with the line activation commands being wired in accordance with the following logic equations:

$S'_i = C'_{i-h'+1} + \ldots + C'_i$ for i varying from $h'-1$ to $L-1$ (end values included); and $S'_i = R^-_{L-h'+i+1} + \ldots + R^-_{L-1} + C'_0 + \ldots + C'_i$ for i varying from 0 to $h'-2$ (end values included);

The carry-out channel $R^+_K$ from the first means is a simple binary channel constituting the output from wiring satisfying the following logic equations:

$$R^+_K = C_{K-h+1} + \ldots + C_{K-1};\text{ and}$$

the carry-out channel $R^+_L$ from the second means is a simple binary channel constituting the output from wiring satisfying the following logic equation:

$$R^+_L = C'_{L-h'+1} + \ldots + C'_{L-1}.$$

According to another aspect, the invention provides a device for activating a certain number of commands taken as function of selection condition from a set of commands organized in a matrix. According to the invention, in order to activate a train of not more than h commands simultaneously and in parallel from within the matrix of K.L commands, regardless of the position of the origin of the train therein, and with the commands being in the following order:

$S_{0,0}, S_{0,1} \ldots S_{0,K-1}$, then $S_{1,0}, S_{1,1} \ldots S_{1,K-1}$ and so on up to $S_{L-1,0}, \ldots S_{L-1,K-1}$, where h, K and L are numbers such that $4 \leq 2h \leq K$ and $L \geq 2$, the device comprises:

a set of K.L means interconnecting K column commands referenced $S_0, \ldots, S_{K-1}$ with 2.L line portion commands referenced $S'_0, S''_0, \ldots, S'_{L-1}, S''_{L-1}$ in accordance with logic functions $S'_i$ and $S_j$ for i varying from 0 to $L-1$ and j varying from 0 to d (end values included), and logic with functions $S''_i$ and $S_j$ for i varying from 0 to $L-1$ and j varying from $d+1$ to $K-1$ (end values included) where d is any number selected from the range $h-2$ and $K-h$ (end values included), and the outputs from said means correspond to the set of K.L matrix-organized commands;

first activation means for the column commands, which first activation means select and simultaneously activate in parallel a first column command and the following $h-1$ column commands on receiving a first signal representative of a portion of the selection condition and designating said first column command to be activated said first means operating in a circular mode so that in the sequence of column commands $S_0, \ldots, S_{K-1}$, the last $S_{K-1}$ is followed by the first $S_0$; and second activation means for the line portion commands, which second activation means select and simultaneously activate in parallel two line portion commands $S'_i$ and $S''_i$ of rank i when the rank j is less than or equal to d, and otherwise select and simultaneously activate in parallel two line portion commands $S''_i$ and $S'_{i+1}$, on receiving firstly a second signal designating a pair of line portions of the same rank i, said second signal being received at the same time as the first means receives its signal, and secondly a third signal indicating whether the first of the column commands to be activated by the first means is of rank j less than or equal to d, or on the contrary is of rank j greater than d.

In order to enable a mode of operation with carry in such a device, the second means further includes a carry output $R^+$ for connection outside the device, which output is activated when the first of the activated line portion commands is $S''_{L-1}$; and the second means further includes a carry input $R^-$ for receiving a signal from outside the device indicative of whether the sole line portion command to be activated is $S'_0$.

The number d may be selected to be equal to $(K/2)-1$. In which case, according to another characteristic of the invention in a device with carry comprising a first address bus $A_{k-1} \ldots A_0$ where $2^k = K$, said first bus delivering the first signal, and comprising a second address bus $A^+, A'_{l-1} \ldots A'_0$ where $2^l = L$, said second bus delivering the second signal;

the third signal is transmitted solely by means of the channel $A_{k-1}$;

the first means is implemented as follows:
it includes a continuously activated decoder having k inputs constituted by the channels of the first bus, and K outputs referenced $C_0 \ldots C_{K-1}$; and it includes wiring whose outputs form the activation commands for the columns in accordance with the following logic equations:

$S_i = C_{i-h+1} \ldots + C_i$ for i varying from $h-1$ to $K-1$ (end values included), and $S_i = C_{K-h+i+1} + \ldots + C_{K-1} + C_0 + \ldots + C_i$ for i varying from 0 to $h-2$ (end values included); and the second means is implemented as follows:
it includes a decoder which is activated when $A^+ = 1$, having $l+1$ inputs constituted by the channels $A'_{l-1} \ldots, A'_0$ of the second bus together with $A_{k-1}$, and 2L outputs referenced $C'_0, C''_0, \ldots C'_{L-1}, C''_{L-1}$; and it includes wiring whose outputs form the activation commands for the line portions in accordance with the following logic equations:

$S'_i = R^- + C'_0$ $S'_i = C''_{i-1} + C'_i$ for i varying from 1 to $L-1$ (end values included), and $S''_i = C'_i + C''_i$ for i varying from 0 to $L-1$ (end values included), and $R^+ = C''_{L-1}$.

In general, a device in accordance with the invention may be used to select a plurality of memory cells in parallel from K.L memory cells disposed in a matrix network, the set of commands capable of being activated by the device corresponds to a set of commands for selecting memory cells in the matrix network of said cells.

Such a device may additionally include:
a data bus referenced $D_{h-1}, \ldots D_0$ which is connected to the memory cells as follows: the cell under the command of $S_{i,j}$ is connected to $D_{h-1-v}$, where $v = (j$ modulo $h)$; and circular permutation means Perm(h) placed on the data bus, said means having h inputs referenced e(j) with j varying over the range 0 to $h-1$ (end values included), having outputs s(j), and having h commands referenced $q_0 \ldots q_{h-1}$ such that the activation of a command $q_i$ performs the following permutation:

$$\begin{bmatrix} e(h-i-1) e(h-i-2) \ldots e(0) e(h-1) \ldots e(h-i) \\ s(h-1) \quad s(h-2) \quad \ldots s(i) \, s(i-1) \ldots s(0) \end{bmatrix},$$

the data bus coming from the memory being applied to the inputs of Perm(h) by making $D_v$ and e(v) correspond, and the outputs from Perm(h) being connected to the data bus for connection to the outside, making s(v) correspond with $D_v$.

Such a device may also include:
a data bus referenced $D_{u,v}$ where u varies from 0 to $h'-1$ and v varies from 0 to $h-1$ (end values included), which bus is connected to the memory cells as follows:
the cell under the command of $S_{i,j}$ is connected to $D_{h'-1-u, h-1-v}$ where $u = (i$ mudulo $h')$ and $v = (j$ modulo $h)$,
a device Perm(h,h') is placed on the data bus, said device having $h+h'$ commands referenced $q_0 \ldots q_{h-1} \, q'_0 \ldots q'_{h-1}$ and hh' input channelS referenced e(u,v) where u varies from 0 to $h'-1$ and v varies from 0 to $h-1$ (end values included), and hh' output channels s(u,v), and is such that each of the h' sets of channels $e(u, h-1), \ldots e(u, 0)$ for u varying from 0 to $h-1$ (end values included) is applied to a device Perm(h) having outputs referenced $I_{u, h-1}, \ldots I_{u, 0}$ and which performs the following permutation for its commands $q_j$ where j varies from 0 to $h-1$ (end values included):

$$\begin{pmatrix} e(u, h-1) \ldots e(u, 0) \, e(u, h-1) \, e(u, h-j) \\ I_{u, h-1} \quad\quad\quad\quad I_{u, 0} \end{pmatrix}.$$

with the h command lines of these h' devices being the same in each of them, with each of the h sets of channels $I_{h'-1,v} \ldots I_{0,v}$ for v varying from 0 to $h-1$ (end values included) being applied to a device Perm(h') whose outputs are $s(h'-1,v) \ldots s(0,v)$ and which performs the following permutation for its commands $q'_i$ where i varies from 0 to $h'-1$ (end values included):

$$\begin{pmatrix} I_{h'-i-1, v} \ldots I_{0,v} \, I_{h'-1,v} \ldots I_{h'-i, v} \\ s(h'-1, v) \quad\quad\quad\quad s(0, v) \end{pmatrix},$$

with the h' command lines of these h devices being the same in each of them; and the data bus coming from the memory is applied to a device Perm(h,h') such that $D_{u,v}$ corresponds to e(u,v), and the output from Perm(h,h') are connected to the data bus for connection to the outside of the system such that s(u,v) corresponds to $D_{u,v}$.

We claim:

1. A device for generating commands for data processing, information storage and memory, for activating, from within a set of K.L output commands organized in a matrix having L lines and K columns of command input wires, a predetermined number of commands forming a submatrix of said matrix of K.L commands of up to h columns and up to h' lines responsive to an externally applied selection signal defining the position of the submatrix in said matrix of commands, a submatrix of not more than hh' commands being activated simultaneously and in parallel, regardless of the position of the submatrix therein, wherein h,h', K and L are numbers such that $4 \leq 2h \leq K$ and $4 \leq 2h' \leq L$, the device comprising:

a set of K.L command means having respective outputs, interconnecting said K column wires ordered from 0 to $K-1$ and referenced as $S_0, \ldots, S_j, \ldots, S_{K-1}$, and L said line wires ordered from 0 to $L-1$ and referenced as $S'_0, \ldots, S'_i, \ldots, S'_{L-1}$, where h, K and L are numbers such that $4 \leq 2h \leq K$ and $L \geq 2$, in accordance with logic functions ($S'_i$ AND $S_j$) performed by said command means, with the outputs of said means forming the set of K.L matrix-organized output commands;

first activation means for each said up to h column commands for selecting and activating in parallel a first column command and subsequently up to $h-1$ column commands in response to a first address signal applied thereto from a first input address bus $A^+, A_{k-1} \ldots A_{t-1} \ldots A_0$, where $K=2^k$, said first address signal representing a first portion of the selection condition and designating said first column commands to be activated; and second activation means for each said up to h' line commands for selecting and activating in parallel a first line command and subsequently up to $h'-1$ line commands in response to a second address signal applied thereto from a second input address bus $A'^+, A'_{l-1} \ldots A'_{t-1} \ldots A'_0$, where $L=2^l$, said second address signal representing a second portion of the selection condition designating said first line command to be activated, said second address signal applied simultaneously with the application of said first address signal to the first activation means.

2. A device according to claim 1, wherein said first activation means operates in a circulate mode such that, in a column command numbering order, the last column command $S_{K-1}$ is followed by the first column command $S_0$ whereby $h-1$ column commands are activated.

3. A device according to claim 1, wherein the second activation means operates in a circular mode such that the line command number order, the last line command $S_{L-1}$ is followed by the first line command $S_0$ whereby $h'-1$ line commands are activated.

4. A device according to claim 1 wherein, to enable a mode of operation with column carry, the first activation means further includes:

a carry-out channel $R^+_K$, for external connection to the device, said carry-out channel providing an overflow-indicating signal from the activated submatrix towards a first, similar device in a column direction whenever the number of the first activated column command is greater than or equal to $K-h+1$; and a carry-in channel $R^-_K$, for receiving an externally applied signal indicative of an overflow from a second similar device, said signal combined with the first address signal so as to indicate a number of column commands to be activated, starting with the first $S_0$.

5. A device according to claim 1, wherein, to enable a mode of operation with a line carry, the second activation means further includes:

a carry-out channel $R^+_L$, for external connection to the device, said carry-out channel providing an overflow-indicating signal from the activated submatrix towards a first similar device in a line direction whenever the number of the first activated column command is greater than or equal to $L-h'+1$; and a carry-in channel $R^-_L$, for receiving an externally applied signal indicative of overflow from a second similar device, said signal combined with the second address signal so as to indicate a number of line commands to be activated, starting with the first $S'_0$.

6. A device according to claim 1, wherein:

the carry-in channel of the first activation means is a binary channel $R^-_K$;

the carry-in channel of the second activation means is a binary channel $R^-_L$;

the first activation means is implemented as follows:

it includes a first decoder which is activated when $R^-_K$ transmits an overflow signal, said decoder having the channels $A_{t-1}, \ldots, A_0$ as inputs and having h commands referenced $R^-_{K-h}, R^-_{K-h+1}, \ldots R^-_{K-1}$ as outputs; and it includes a second decoder which is activated when $A^+ = 1$, said decoder having the channels $A_{k-1} \ldots A_0$ as inputs and having K commands referenced $C_0, \ldots, C_{K-1}$ as outputs;

with the column commands being wired in accordance with the following logic equations:

$S_j = C_{j-h+1} + \ldots + R^-_{K-1} + C_0 + \ldots + C_j$ for j varying from 0 to $h-2$ (end values included);

the second activation means is implemented as follows:

it includes a first decoder which is activated when $R^-_L$ transmits an overflow signal, said decoder having the channels $A'_{l-1}, \ldots, A'_0$ as inputs and having h' commands referenced $R^-_{L-h'}, R^-_{L-h'+1}, \ldots R^-_{L-1}$ as outputs; and it includes a second decoder which is activated when $A'^+ = 1$, said decoder having the channels $A'_{l-1} \ldots A'_0$ as inputs and having L commands referenced $C'_0, \ldots, C'_{K-1}$ as outputs;

with the line commands being wired in accordance with the following logic equations:

$S'_i = C'_{i-h'+1} + \ldots + C'_i$ for i varying from $h'-1$ to $L-1$ (end values included); and $S'_i = R^-_{L-h'+i+1} + \ldots + R^-_{l-1} + C'_0 + \ldots + C'_i$ for i varying from 0 to $h'-2$ (end values included);

the carry-out channel $R^+_K$ from the first activation means is a binary channel constituting the output from wiring satisfying the following logic equation:

$R^+_K = C_{K-h+1} + \ldots + C_{K-1}$; and the carry-out channel $R^+_L$ from the second activation means is a binary channel constituting the output from wiring satisfying the following logic equation:

$R^+_L = C'_{L-h'+1} + \ldots + C'_{L-1}$.

7. A device for generating commands for data processing, storage and memory, for activating, from within a set of K.L output commands organized in a matrix having L lines and K columns of command input wires, a predetermined number of commands forming a train of up to h commands of said K.L output commands responsive to an externally applied selection signal defining the position of the train, and to activate the commands of the train of up to h commands simultaneously and in parallel, regardless of the position of origin of the train therein, and with the commands being in the following order:

$S_{0,0}, S_{0,1} \ldots S_{0,K-1}$, then $S_{1,0}, S_{1,1} \ldots S_{1,K-1}$ and so on up to $S_{L-1,0}, \ldots S_{L-1,K-1}$, where h, K and L are numbers such that $4 \leq 2h \leq K$ and $L > 2$, the device comprising:

a set of K.L command means having respective outputs, interconnecting said K column wires referenced $S_0, \ldots, S_{K-1}$, with 2.L line portion wires referenced $S_0, S''_0, \ldots, S'_{L-1}, S''_{L-1}$ in accordance with logic functions $(S'_i \text{ AND } S_j)$ performed by a part of said set of K.L command means for i varying from 0 to $L-1$ and j varying from 0 to d and in accordance with logic functions $(S''_i \text{ AND } S_j)$ performed by the remaining part of said K.L command means for i varying from 0 to $L-1$ and j varying from $d+1$ to $K-1$ where d is a number selected from the range $h-2$ to $K-h$, and the outputs from said means forming the set of K.L matrix-organized output commands;

first activation means for each said up to h column commands for selecting and activating in parallel a first column command and subsequently up to $h-1$ column commands in response to a first address signal applied thereto from a first input address bus $A^+, A_{k-1} \ldots A_{t-1} \ldots A_0$, where $K=2^k$, said first address signal representing a first portion of the selection condition and designating said first column command to be activated, said first activation means operating in a circular mode so that in a sequence of column commands $S_0, \ldots, S_{K-1}$, the last $S_{K-1}$ is followed by the first $S_0$; and second activation means for each said two line portion commands for selecting and activating in parallel two line portion commands $S'_i$ and $S''_i$ of rank i when the rank j is less than or equal to d, and otherwise selecting and simultaneously activating in parallel two line portion commands $S''_i$ and $S'_{i+1}$, in response to a second address signal applied thereon from a second address bus $A'^+$, $A'_{l-1} \ldots A'_{t-1} \ldots A'_0$, where $L=2^l$, the second address signal designating a pair of line portions of the same rank i, said second address signal being applied at the same time as the first address signal is applied to the first activation means, and applying a third address signal from said first address bus thereto, the third signal indicating whether the first of the column commands to be activated by the first means is of rank j less than or equal to d, or on the contrary is of rank j greater than d.

8. A device according to claim 7, having a mode of operation with carry, wherein:

the second activation means further includes a carry output $R^+$ for connection external to the device, said carry output activated when the first of the activated line portion commands is $S''_{L-1}$; and the second activation means further includes a carry input $R^-$ for receiving an external signal indicative of whether the sole line portion command to be activated is $S'_0$.

9. A device according to claim 7, wherein the number d is selected to be equal to $(K/2)$.

10. A device according to claim 7, wherein:

the third signal is transmitted solely by means of the channel $A_{k-1}$ of said first address bus;

the first activation means including:

a continuously activated decoder having k inputs constituted by the channels of the first address bus, and K outputs referenced $C_0 \ldots C_{K-1}$; and wiring whose outputs form the activation commands for the columns in accordance with the following logic equations:

$S_i = C_{i-h+1} + \ldots + C_i$ for i varying from $h-1$ to $K-1$; and $S_i = C_{K-h+i+1} + \ldots + C_{K-2} + C_0 + \ldots + C_i$ for i varying from 0 to $h-2$; and the second activation means includes:

a decoder which is activated when $A^+ = 1$, having $1+1$ inputs constituted by the channels $A'_{l-1} \ldots, A'_0$ of the second address bus together with $A_{k-1}$, and 2L outputs referenced $C'_0, C''_0, \ldots C'_{L-1}, C''_{L-1}$; and wiring whose outputs form the activation commands for the line portions in accordance with the following logic equations:

$S'_i = R^- + C'_0$  $S'_i = C''_{i-1} + C'_i$ for i varying from m1 to $L-1$, and $S''_i = C'_i + C''_i$ for i varying from 0 to $L-1$, and $R^+ = C''_{L-1}$.

11. A device according to claim 7, wherein, in order to select a plurality of memory cells in parallel from said K.L memory cells disposed in a matrix network, the set of commands capable of being activated by the device corresponds to the set of commands for selecting memory cells in the matrix network of said K.L memory cells.

12. A device according to claim 7, further comprising:

a data bus referenced $D_{h-1}, \ldots D_0$ connected to the memory cells wherein the cell under the command of $S_{i,j}$ is connected to $D_{h-1-v}$, where $v = (h$ modulo h); and circular permutation means Perm(h) placed on the data bus, said circular permutation means having h inputs referenced e(j) with j varying over the range 0 to $h-1$, having outputs s(j), and having h commands referenced $q_0 \ldots q_{h-1}$ such that the activation of a command $q_i$ performs the following permutation:

$$\begin{bmatrix} e(h-i-1)e(h-i-2)\ldots e(0)e(h-1)\ldots e(h-i) \\ s(h-1) \quad s(h-2) \quad \ldots s(i) \; s(i-1) \ldots s(0) \end{bmatrix},$$

the data bus coming from the memory being applied to the inputs of Perm(h) by making $D_v$ and e(v) correspond, and the outputs from Perm(h) being connected to the data bus for connection to the outside, making s(v) correspond with $D_v$.

13. A device according to claim 1, further comprising:

a data bus referenced $D_{u,v}$ where u varies from 0 to $h'-1$ and v varies from 0 to $h-1$, said data bus connected to the memory cells wherein the cell under the command of $S_{i,j}$ is connected to $D_{h'-1-u,h-1-v}$ where $u=(i$ modulo $h')$ and $v=(j$ modulo $h)$, a device Perm (h,h') is placed on the data bus, said device having h+h' commands referenced $q_0 \ldots q_{h-1} q'_0 \ldots q'_{h-1}$ and hh' input channels referenced e(u,v) where u varies from 0 to h'−1 and v varies from 0 to h−1, and hh' output channels s(u,v), and is such that each of the h' sets of channels e(u,h−1), ... e(u,0) for u varying from 0 to h−1 is applied to a device Perm(h) having outputs referenced $I_{u,h-1}, \ldots I_{u,0}$ and which performs the following permutation for its commands $q_j$ where j varies from 0 to h−1:

$$\begin{pmatrix} e(u,h-1) \ldots e(u,0) & e(u,h-1) & e(u,h-j) \\ I_{u,h-1} & & I_{u,0} \end{pmatrix},$$

with the h command lines of these h' devices being the same in each of them, with each of the h sets of channels $I_{h'-1,v} \ldots I_{0,v}$ for v varying from 0 to h−1 being applied to a device Perm(h') outputs s(h'−1,v) ... s(0,v) and which performs the following permutation for its commands $q'_i$ where i varies from 0 to h'−1:

$$\begin{pmatrix} I_{h'-i-1,v} \ldots I_{0,v} I_{h'-1,v} \ldots I_{h'-i,v} \\ s(h'-1,v) & & s(0,v) \end{pmatrix},$$

with the h' command lines of these h devices being the same in each of them; and the data bus coming from the memory applied to the device Perm (h,h') such that $D_{u,v}$ corresponds to e(u,v), and the outputs from Perm(h,h') connected to the data bus for connection external to the system such that s(u,v) corresponds to $D_{u,v}$.

14. A device according to claim 1, wherein, in order to select a plurality of memory cells in parallel from said K.L memory cells disposed in a matrix network, the set of commands capable of being activated by the device corresponds to the set of commands for selecting memory cells in the matrix network of said K.L memory cells.

15. A device according to claim 7, further comprising:

a data bus referenced $D_{u,v}$ where u varies from 0 to h'−1 and v varies from 0 to h−1, said data bus connected to the memory cells as follows:

the cell under the command of $S_{i,j}$ is connected to $D_{h'-1-u,h-1-v}$ where $u=(i$ modulo $h')$ and $v=(j$ modulo $h)$, a device Perm (h,h') is placed on the data bus, said device having h+h' commands reference $q_0 \ldots q_{h-1} q'_0 \ldots q'_{h-1}$ and hh' input channels referenced e(u,v) where u varies from 0 to h'−1 and v varies from 0 to h−1, and hh' output channels s(u,v), each of the h' sets of channels e(u,h−1), ... e(u,0) for u varying from 0 to h−1 is applied to a device Perm(h) having outputs referenced $I_{u,h-1}, \ldots I_{u,0}$ for performing the following permutation for its commands $q_j$ where j varies from 0 to h−1:

$$\begin{pmatrix} e(u,h-1) \ldots e(u,0) & e(u,h-1) & e(u,h-j) \\ I_{u,h-1} & & I_{u,0} \end{pmatrix},$$

with the h command lines of these h' devices being the same in each of them, with each of the h sets of channels $I_{h'-1,v} \ldots I_{0,v}$ for v varying from 0 to h−1 being applied to a device Perm(h') whose outputs are s(h'−1,v) ... s(0,v) and which performs the following permutation for its commands $q'_i$ where i varies from 0 to h'−1:

$$\begin{pmatrix} I_{h'-i-1,v} \ldots I_{0,v} I_{h'-1,v} \ldots I_{h'-i,v} \\ s(h'-1,v) & & s(0,v) \end{pmatrix},$$

with the h' command lines of these h devices being the same in each of them; and the data bus coming from the memory is applied to the device Perm (h,h') such that $D_{u,v}$ corresponds to e(u,v), and the outputs from Perm(h,h') are connected to the data bus for connection external to the device such that s(u,v) corresponds to $D_{u,v}$.

16. A device according to claim 7, wherein, in order to select a plurality of memory cells in parallel from K.L memory cells disposed in a matrix network, the set of commands capable of being activated by the device corresponds to the set of commands for selecting memory cells in the matrix network of said K.L memory cells.

* * * * *